(12) United States Patent
Singh et al.

(10) Patent No.: US 12,136,978 B2
(45) Date of Patent: Nov. 5, 2024

(54) ON SUBBAND CONFIGURATION FOR REDUCED CSI COMPUTATION TIME

(71) Applicant: Telefonaktiebolaget LM Ericsson (publ), Stockholm (SE)

(72) Inventors: Bikramjit Singh, Kirkkonummi (FI); Jonas Fröberg Olsson, Ljungsbro (SE); Yufei Blankenship, Kildeer, IL (US); Mattias Andersson, Sundbyberg (SE); Kittipong Kittichokechai, Järfälla (SE); Zhenhua Zou, Solna (SE); Siva Muruganathan, Stittsville (CA); Shiwei Gao, Nepean (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 18/005,398

(22) PCT Filed: Jul. 27, 2021

(86) PCT No.: PCT/SE2021/050755
§ 371 (c)(1),
(2) Date: Jan. 13, 2023

(87) PCT Pub. No.: WO2022/025814
PCT Pub. Date: Feb. 3, 2022

(65) Prior Publication Data
US 2023/0275636 A1   Aug. 31, 2023

Related U.S. Application Data

(60) Provisional application No. 63/057,514, filed on Jul. 28, 2020.

(51) Int. Cl.
H04B 7/06 (2006.01)
(52) U.S. Cl.
CPC .................. H04B 7/0626 (2013.01)
(58) Field of Classification Search
CPC .. H04B 7/0619; H04B 7/0621; H04B 7/0626; H04B 7/0628; H04B 7/063;
(Continued)

(56) References Cited

U.S. PATENT DOCUMENTS 9,654,264 B2 *   5/2017   Athley ................. H04L 5/0048
9,960,828 B2 *   5/2018   Petersson ............ H04B 7/0491
(Continued)

OTHER PUBLICATIONS

International Search Report and Written Opinion dated Oct. 8, 2021 for International Application No. PCT/ SE2021/050755 filed Jul. 27, 2021, consisting of 10-pages.
(Continued)

*Primary Examiner* — James M Perez
(74) *Attorney, Agent, or Firm* — Weisberg I.P. Law, P.A.

(57) ABSTRACT

A method in a user equipment, UE, for reporting channel state information, CSI, to a network includes determining a number of subbands of a bandwidth part, BWP, to report CSI. The method further includes determining a CSI computation time including a CSI computation delay requirement. The method further includes performing CSI estimation for a plurality of the number of subbands based on the CSI computation time. The method further includes reporting the CSI report for at least one of the number of subbands. Analogous UEs, computer programs and computer program products are also provided.

18 Claims, 11 Drawing Sheets

(58) Field of Classification Search
CPC .. H04B 7/0632; H04B 7/0636; H04B 7/0639; H04B 7/0641; H04B 7/0643; H04B 7/0645; H04B 7/0647; H04B 7/065
See application file for complete search history.

(56) References Cited

U.S. PATENT DOCUMENTS

| | | | | |
|---|---|---|---|---|
| 10,313,088 | B2* | 6/2019 | Harrison | H04L 5/0035 |
| 10,715,286 | B2* | 7/2020 | Chen | H04L 5/0091 |
| 10,880,059 | B2* | 12/2020 | Muruganathan | H04B 7/0632 |
| 10,903,886 | B2* | 1/2021 | Faxér | H04L 5/0057 |
| 11,297,520 | B2* | 4/2022 | Hosseini | H04L 1/0023 |
| 11,509,363 | B2* | 11/2022 | Timo | H04B 7/0456 |
| 11,728,851 | B2* | 8/2023 | Timo | H03M 7/6047 |
| | | | | 375/262 |
| 11,757,511 | B2* | 9/2023 | Faxér | H04L 5/0057 |
| | | | | 370/329 |
| 2015/0326299 | A1* | 11/2015 | Petersson | H01Q 21/061 |
| | | | | 370/329 |
| 2015/0333884 | A1* | 11/2015 | Athley | H04W 16/28 |
| | | | | 375/295 |
| 2015/0333885 | A1* | 11/2015 | Athley | H04B 7/0617 |
| | | | | 375/219 |
| 2016/0211900 | A1* | 7/2016 | Athley | H04B 7/0456 |
| 2017/0250745 | A1* | 8/2017 | Athley | H04B 7/0617 |
| 2018/0368142 | A1* | 12/2018 | Liou | H04W 74/0808 |
| 2019/0013911 | A1* | 1/2019 | Muruganathan | H04B 7/0452 |
| 2019/0053094 | A1* | 2/2019 | Hosseini | H04L 5/0094 |
| 2019/0165846 | A1* | 5/2019 | Kim | H04B 7/0643 |
| 2019/0200413 | A1* | 6/2019 | Hong | H04W 76/27 |
| 2019/0208429 | A1* | 7/2019 | Hong | H04L 5/001 |
| 2019/0229874 | A1* | 7/2019 | Lee | H04L 5/00 |
| 2020/0052837 | A1* | 2/2020 | Zhang | H04L 5/005 |
| 2020/0177254 | A1* | 6/2020 | Lee | H04W 76/27 |
| 2020/0245348 | A1* | 7/2020 | Chen | H04W 72/23 |
| 2021/0105055 | A1* | 4/2021 | Chae | H04L 5/0026 |
| 2021/0160864 | A1* | 5/2021 | Lin | H04L 5/0062 |
| 2021/0212033 | A1* | 7/2021 | Islam | H04L 1/0026 |
| 2022/0053477 | A1* | 2/2022 | Yao | H04W 72/541 |
| 2022/0103209 | A1* | 3/2022 | Hao | H04B 7/0456 |
| 2022/0217694 | A1* | 7/2022 | Kim | H04L 1/1864 |
| 2022/0239358 | A1* | 7/2022 | Kim | H04B 7/063 |
| 2022/0321189 | A1* | 10/2022 | Wei | H04W 8/24 |
| 2022/0352950 | A1* | 11/2022 | Faxér | H04B 7/0626 |
| 2022/0376871 | A1* | 11/2022 | Muruganathan | H04B 7/2125 |
| 2023/0056263 | A1* | 2/2023 | Kim | H04L 5/0048 |
| 2023/0057047 | A1* | 2/2023 | Hosseini | H04L 1/1812 |
| 2023/0171070 | A1* | 6/2023 | Bhamri | H04L 1/08 |
| | | | | 370/329 |
| 2023/0189030 | A1* | 6/2023 | Hindy | H04W 24/10 |
| | | | | 370/252 |
| 2023/0189031 | A1* | 6/2023 | Hindy | G06N 3/04 |
| | | | | 370/252 |
| 2023/0208489 | A1* | 6/2023 | Bhamri | H04L 1/0027 |
| | | | | 370/329 |
| 2023/0208490 | A1* | 6/2023 | Kim | H04B 7/0626 |
| | | | | 370/329 |
| 2023/0246689 | A1* | 8/2023 | Islam | H04B 7/0628 |
| | | | | 370/329 |
| 2023/0269039 | A1* | 8/2023 | Gao | H04L 5/001 |
| | | | | 370/330 |
| 2023/0269612 | A1* | 8/2023 | Muruganathan | H04L 1/0027 |
| | | | | 370/252 |
| 2023/0275636 | A1* | 8/2023 | Singh | H04B 7/0626 |
| | | | | 375/299 |
| 2023/0291451 | A1* | 9/2023 | Su | H04L 1/08 |
| 2023/0319708 | A1* | 10/2023 | Ma | H04W 8/24 |
| | | | | 455/574 |
| 2023/0353262 | A1* | 11/2023 | Ibrahim | H04W 24/10 |
| 2023/0354074 | A1* | 11/2023 | Ibrahim | H04B 7/0417 |
| 2023/0361840 | A1* | 11/2023 | Santhappan | H04B 17/345 |
| 2023/0362912 | A1* | 11/2023 | Chen | H04W 24/10 |
| 2024/0023080 | A1* | 1/2024 | Wei | H04L 5/0051 |
| 2024/0072978 | A1* | 2/2024 | Abotabl | H04B 7/0626 |

OTHER PUBLICATIONS

3GPP TS 38.213 V16.0.0; 3rd Generation Partnership Project; Technical Specification Group Radio Access Network; NR; Physical layer procedures for control (Release 16); Dec. 2019, consisting of 155-pages.
3GPP TS 38.306 V16.1.0; 3rd Generation Partnership Project; Technical Specification Group Radio Access Network; NR; User Equipment (UE) radio access capabilities (Release 16); Jul. 2020, consisting of 110-pages.
ETSI TS 138 214 V15.7.0; Technical Specification; 5G; NR; Physical layer procedures for data (3GPP TS 38.214 version 15.7.0 Release 15); Oct. 2019, consisting of 108-pages.
ETSI TS 138 214 V16.2.0; Technical Specification; 5G; NR; Physical layer procedures for data (3GPP TS 38.214 version 16.2.0 Release 16); Jul. 2020 consisting of 167-pages.
3GPP TSG RAN WG1 Meeting #96 R1-19xxxxxx; Title: Maintenance for CSI acquisition; Agenda Item: 7.1.2; Source: Ericsson; Document for: Discussion and Decision; Date and Location: Feb. 25-Mar. 1, 2019, Athens, Greece, consisting of 11-pages.

* cited by examiner

RESPONSIVE TO A *REPORTQUANTITY* BEING SET TO 'CRI-RI-PMI-CQI', OR 'CRI-RI-LI-PMI-CQI', DETERMINING THAT PRE-CODING MATRIX INDICATOR, PMI, REPORTING IS WIDEBAND AND CHANNEL QUALITY INDICATOR, CQI, REPORTING IS SUBBAND USING $Z_1$ AND $Z'_1$
501

RESPONSIVE TO THE *REPORTQUANTITY* BEING SET TO 'CRI-RI-PMI-CQI', OR 'CRI-RI-LI-PMI-CQI', DETERMINING THAT PMI REPORTING IS SUBBAND USING $Z_1$ AND $Z'_1$, AND CQI REPORTING IS WIDEBAND
503

RESPONSIVE TO THE *REPORTQUANTITY* BEING SET TO 'CRI-RI-CQI' OR 'CRI-RI-I1-CQI', DETERMINING THAT CQI REPORTING IS A SUBBAND CQI WITH A LOWEST CQI INDEX IN ADDITION TO WIDEBAND PMI AND CQI USING $Z_1$ AND $Z'_1$
505

Figure 5

RESPONSIVE TO THE UE BEING CONFIGURED TO EVALUATE A SUBSET OF SUBBANDS IN THE BWP AND THE UE IS TRIGGERED BY THE NETWORK TO REPORT, STARTING A TIMER
601

PERFORMING REPORTING ON THE SUBSET OF SUBBANDS RESPONSIVE TO THE TIMER NOT BEING EXPIRED
603

RESPONSIVE TO THE TIMER EXPIRING, RESUMING REPORTING CSI ACCORDING TO RRC PARAMETERS
605

Figure 6

REDUCING THE NUMBER OF SUBBANDS TO REPORT CSI ON BY PROVIDING LARGER SUBBAND SIZES
701

Figure 7

LIMITING THE SUBBAND CSI REPORTING TO ODD SUBBANDS ONLY OR EVEN SUBBANDS ONLY
801

Figure 8

RECEIVING A CONFIGURATION OF A RESULTANT CHANNEL STATE INFORMATION-REFERENCE SIGNAL, CSI-RS, WITH A SPAN:
901 - ACROSS THE BWP
903 - ACROSS A PORTION OF THE BWP
905 - OF SINGLE PERIODICITY ACROSS THE BWP
907 - OF DIFFERENT PERIODICITIES IN DIFFERENT PORTIONS OF BWP OR IN DIFFERENT SUBBANDS

Figure 9

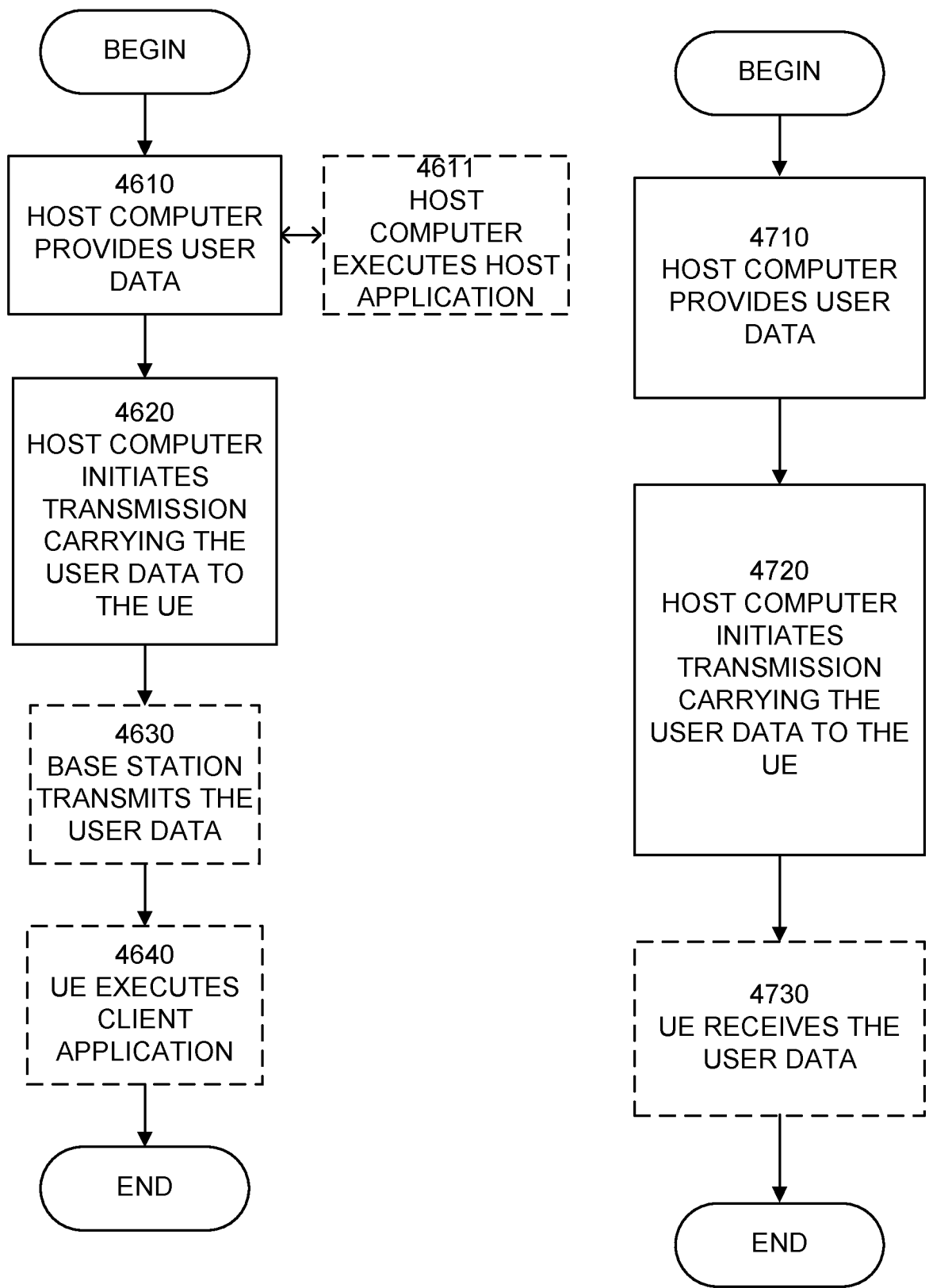

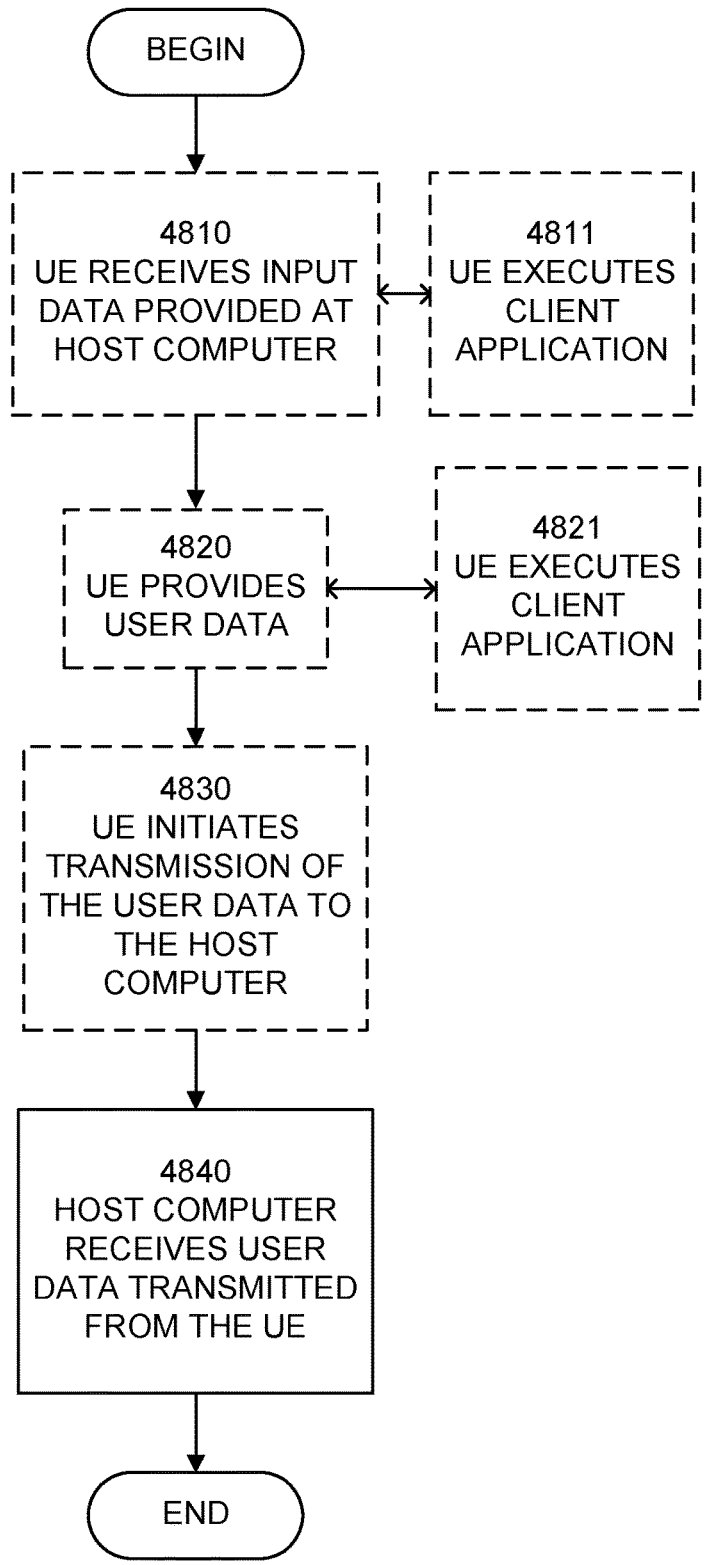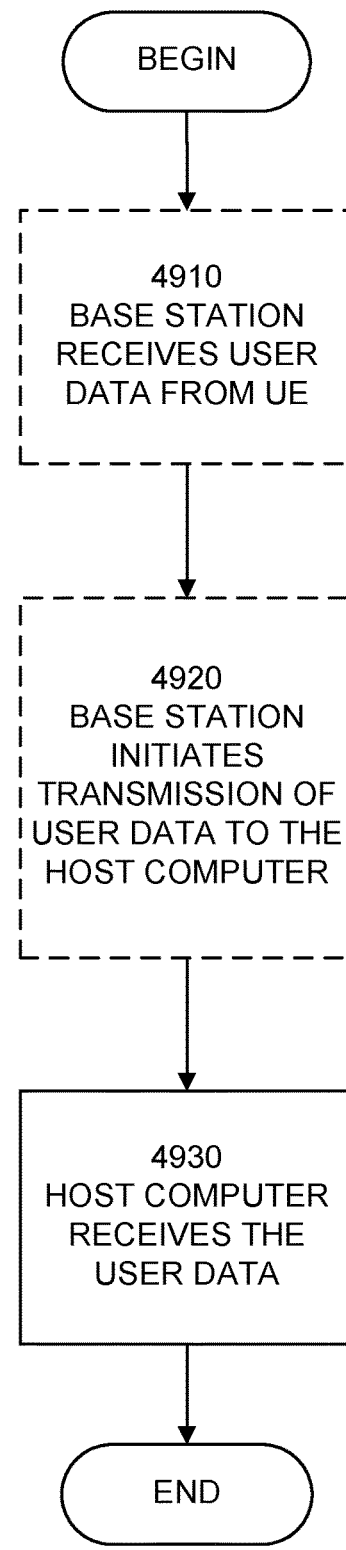
Figure 17
Figure 18

ON SUBBAND CONFIGURATION FOR REDUCED CSI COMPUTATION TIME

CROSS-REFERENCE TO RELATED APPLICATIONS

This application is a Submission Under 35 U.S.C. § 371 for U.S. National Stage Patent Application of International Application No.: PCT/SE2021/050755, filed Jul. 27, 2021 entitled "ON SUBBAND CONFIGURATION FOR REDUCED CSI COMPUTATION TIME," which claims priority to U.S. Provisional Application No. 63/057,514, filed Jul. 28, 2020, entitled "ON SUBBAND CONFIGURATION FOR REDUCED CSI COMPUTATION TIME," the entireties of both of which are incorporated herein by reference.

TECHNICAL FIELD

The present disclosure relates generally to communications, and more particularly to communication methods and related devices and nodes supporting wireless communications.

BACKGROUND

Due to the varying nature of wireless communication channels, data transmission between a gNB and a user equipment (UE) needs to adapt the modulation scheme and code rate to suit different channel conditions. In NR (new radio), downlink transmission methods such as multi-layer transmission, transmission point selection, beam selection etc. are very flexible. Therefore, in NR the CSI (Channel State Information) may consist of one or more out of:
  RI: rank Indicator
  CQI: Channel Quality Indicator
  PMI: Pre-coding Matrix Indicator
  CRI: CSI-RS (Channel State Information-Reference Signal) Resource Indicator
  LI: Layer Indicator
  SSBRI: SS/PBCH (Synchronization Signal/Physical Broadcast Channel) Block Resource Indicator
  L1-RSRP (Reference Signal Received Power) or L1-SINR (Signal to Interference and Noise Ratio)

In NR, the reported CQI value can be with respect to one of three CQI tables, Table 1, Table 2, and Table 3 (corresponding to respectively to Table 5.2.2.1-2, Table 5.2.2.1-3, and Table 5.2.2.1-4 in section 5.2.2.1 of 3GPP (Third Generation Partnership Project) technical specification TS38.214). If Table 1 or Table 2 is configured the UE reports a CQI value such that a PDSCH (physical downlink shared channel) with modulation, target code rate and transport block size corresponding to the CQI value assigned on a so-called CSI reference resource could be received with a BLEP (BLock-Error Probability) not exceeding 10%. For Table 1 the highest modulation is 64QAM while for Table 2 the highest modulation is 256QAM. For Table 3 the highest modulation is 64QAM but the BLEP shall not exceed $10^{-5}$. The CSI reference resource for a serving cell is defined in 3GPP TS 38.214.

CSI reporting configured via a higher layer parameter CSI-ReportConfig (see section 6.3.2 of 3gpp TS38.331) can have one, two or three CSI resource settings, i.e., resourcesForChannelMeasurement, csi-IM-ResourcesForInterference and nzp-CSI-RS-ResourcesForInterference, where the resource settings can be one of three types: aperiodic, semi-persistent or periodic. Each resource setting corresponds to a higher layer parameter CSI-ResourceConfig. A resource setting specifies one or more CSI measurement resources. If one resource setting is configured, the resourcesForChannelMeasurement is used for L1-RSRP channel measurement. If two resource settings are configured, resourcesForChannelMeasurement is used for channel measurement while the second one is used for interference measurement. The second resource setting is either specified via csi-IM-ResourceForInterference or nzp-CSI-RS-ResourcesForInterference. When a nzp-CSI-RS resource for interference measurement is configured, UE performs channel estimation on the actual CSI-RS transmitted but interprets the signal as interference in CSI evaluation. Three resource settings can also be configured wherein resourcesForChannelMeasurement specifies resources for channel measurement and both the csi-IM-ResourceForInterference and nzp-CSI-RS-ResourcesForInterference specifies the resources for interference measurement.

Periodic CSI reports are sent on the physical uplink control channel (PUCCH) (or on PUSCH (physical uplink shared channel) when there is PUSCH data) and can be linked to periodic resource setting(s). Semi-persistent CSI reports can be sent on PUCCH or PUSCH (with or without PUSCH data) and can be linked to periodic or semi-static resource setting(s). Only a-periodic CSI report can be linked to all three types of resource settings (periodic, semi-static and a-periodic). For a-periodic CSI report, a CSI-AperiodicTriggerState is associated with one or more CSI-ReportConfig and a CSI trigger state is further associated with a codepoint of the "CSI request" field in DCI (Downlink Control Information).

3GPP TS38.214 Table 5.2.1.4-1 shows the supported combinations of CSI Reporting configurations and CSI Resource configurations and how the CSI Reporting is triggered for each CSI Resource configuration.

NR Rel-16, CSI Computation Time for DCI-Triggered CSI Reports

According to section 5.4 of TS38.214, "when the CSI request field on a DCI triggers a CSI report(s) on PUSCH, the UE shall provide a valid CSI report for the n-th triggered report,
  if the first uplink symbol to carry the corresponding CSI report(s) including the effect of the timing advance, starts no earlier than at symbol $Z_{ref}$, and
  if the first uplink symbol to carry the n-th CSI report including the effect of the timing advance, starts no earlier than at symbol $Z'_{ref}(n)$, where $Z_{ref}$ is defined as the next uplink symbol with its CP starting $T_{proc,CSI}=(Z)(2048+144)\cdot\kappa 2^{-\mu}\cdot T_C$ after the end of the last symbol of the PDCCH triggering the CSI report(s), and where $Z'_{ref}(n)$, is defined as the next uplink symbol with its CP starting $T_{proc,CSI}=(Z')(2048+144)\cdot\kappa 2^{-\mu}\cdot T_C$ after the end of the last symbol in time of the latest of: aperiodic CSI-RS resource for channel measurements, aperiodic CSI-IM used for interference measurements, and aperiodic NZP CSI-RS for interference measurement, when aperiodic CSI-RS is used for channel measurement for the n-th triggered CSI report.

If the PUSCH indicated by the DCI is overlapping with another PUCCH or PUSCH, then the CSI report(s) are multiplexed following the procedure in clause 9.2.5 of TS 38.213 and clause 5.2.5 when applicable, otherwise the CSI report(s) are transmitted on the PUSCH indicated by the DCI.

When the CSI request field on a DCI triggers a CSI report(s) on PUSCH, if the first uplink symbol to carry the corresponding CSI report(s) including the effect of the timing advance, starts earlier than at symbol $Z_{ref}$,
  the UE may ignore the scheduling DCI if no HARQ-ACK or transport block is multiplexed on the PUSCH.

When the CSI request field on a DCI triggers a CSI report(s) on PUSCH, if the first uplink symbol to carry the n-th CSI report including the effect of the timing advance, starts earlier than at symbol $Z'_{ref}(n)$,
  the UE may ignore the scheduling DCI if the number of triggered reports is one and no HARQ-ACK or transport block is multiplexed on the PUSCH
  Otherwise, the UE is not required to update the CSI for the n-th triggered CSI report.

Z, Z' and μ are defined as:

$$Z = \max_{m=0,\ldots,M-1}(Z(m)) \text{ and } Z' = \max_{m=0,\ldots,M-1}(Z'(m)),$$

where M is the number of updated CSI report(s) according to Clause 5.2.1.6, (Z(m), Z'(m)) corresponds to the m-th updated CSI report and is defined as
  ($Z_1,Z'_1$) of the table 5.4-1 if the CSI is triggered without a PUSCH with either transport block or HARQ-ACK or both when L=0 CPUs are occupied (according to Clause 5.2.1.6) and the CSI to be transmitted is a single CSI and corresponds to wideband frequency-granularity where the CSI corresponds to at most 4 CSI-RS ports in a single resource without CRI report and where CodebookType is set to 'typeI-SinglePanel' or where reportQuantity is set to 'cri-RI-CQI', or
  ($Z_1,Z'_1$) of the table 5.4-2 if the CSI to be transmitted corresponds to wideband frequency-granularity where the CSI corresponds to at most 4 CSI-RS ports in a single resource without CRI report and where CodebookType is set to 'typeI-SinglePanel' or where reportQuantity is set to 'cri-RI-CQI', or
  ($Z_1,Z'_1$) of the table 5.4-2 if the CSI to be transmitted corresponds to wideband frequency-granularity where the reportQuantity is set to 'ssb-Index-SINR', or reportQuantity is set to 'cri-SINR', or
  ($Z_3,Z'_3$) of the table 5.4-2 if reportQuantity is set to 'cri-RSRP' or 'ssb-Index-RSRP', where $X_\mu$ is according to UE reported capability beamReportTiming and $KB_l$ is according to UE reported capability beamSwitchTiming as defined in 3GPP TS 38.306, or
  ($Z_2,Z'_2$) of table 5.4-2 otherwise.
μ of table 5.4-1 and table 5.4-2 corresponds to the min ($μ_{PDCCH}$, $μ_{CSI-RS}$, $μ_{UL}$)
where the $μ_{PDCCH}$ corresponds to the subcarrier spacing of the PDCCH with which the DCI was transmitted and $μ_{UL}$ corresponds to the subcarrier spacing of the PUSCH with which the CSI report is to be transmitted and $μ_{CSI-RS}$ corresponds to the minimum subcarrier spacing of the aperiodic CSI-RS triggered by the DCI."

TABLE 5.4-1

CSI computation delay requirement 1 (reproduced from 3gpp TS38.214)

| | $Z_1$ [symbols] | |
|---|---|---|
| μ | $Z_1$ | $Z'_1$ |
| 0 | 10 | 8 |
| 1 | 13 | 11 |
| 2 | 25 | 21 |
| 3 | 43 | 36 |

TABLE 5.4-2

CSI computation delay requirement 2 (reproduced from 3gpp TS38.214)

| | $Z_1$ [symbols] | | $Z_2$ [symbols] | | $Z_3$ [symbols] | |
|---|---|---|---|---|---|---|
| μ | $Z_1$ | $Z'_1$ | $Z_2$ | $Z'_2$ | $Z_3$ | $Z'_3$ |
| 0 | 22 | 16 | 40 | 37 | 22 | $X_0$ |
| 1 | 33 | 30 | 72 | 69 | 33 | $X_1$ |
| 2 | 44 | 42 | 141 | 140 | min(44, $X_2 + KB_1$) | $X_2$ |
| 3 | 97 | 85 | 152 | 140 | min(97, $X_3 + KB_2$) | $X_3$ |

CSI Report Configuration

CSI reports in Rel-16 are configured by radio resource control (RRC) using the RRC control information element CSI-ReportConfig. PMI and CQI in a CSI report can be wideband or subband. For wideband PMI or CQI, a single PMI or a single CQI per codeword is reported over the entire configured CSI bandwidth. For subband PMI or CQI, a PMI or CQI for each subband are reported in addition to the wideband PMI and CQI.

The subband report is configured by the two fields csi-ReportingBand and subbandSize.

csi-ReportingBand indicates a contiguous or non-contiguous subset of subbands in the bandwidth part which CSI shall be reported for. Each bit in the bit-string represents one subband. The right-most bit in the bit string represents the lowest subband in the BWP (bandwidth part). The choice determines the number of subbands (subbands3 for 3 subbands, subbands4 for 4 subbands, and so on) (see TS 38.214, clause 5.2.1.4). This field is absent if there are less than 24 PRBs (physical resource blocks) (no sub band) and present otherwise, the number of sub bands can be from 3 (24 PRBs, sub band size 8) to 18 (72 PRBs, sub band size 4).

subbandSize indicates one out of two possible Bandwidth Part (BWP)-dependent values for the subband size as indicated in TS 38.214, table 5.2.1.4-2, reproduced below.

TABLE 5.2.1.4-2

Configurable Subband Sizes

| Bandwidth part (PRBs) | Subband size (PRBs) |
|---|---|
| <24 | N/A |
| 24-72 | 4, 8 |
| 73-144 | 8, 16 |
| 145-275 | 16, 32 |

The higher layer parameter codebookConfig or codebookConfig-r16 defines the pre-coder codebook which may specify rank restriction and/or pre-coder subset restriction. The rank restriction indicates which ranks UE shall evaluate and pre-coder subset restriction specifies a subset of pre-coders UE shall evaluate. If UE is configured with codebookConfig-r16 it shall ignore the codebookConfig (without suffix) field.

Method to Evaluate CSI

The precise method used to determine CSI to be reported is not specified except for requirements and conformance testing and is up to UE implementation. However, specification states (Section 5.2.1.4 of TS38.214):

LI shall be calculated conditioned on the reported CQI, PMI, RI (rank indicator) and CRI CQI shall be calculated conditioned on the reported PMI, RI and CRI PMI shall be calculated conditioned on the reported RI and CRI RI shall be calculated conditioned on the reported CRI.

A typical method in UE would be to determine PMI, RI and CQI for a specific CRI such that the downlink throughput is maximized with the indicated via CSI. One common way to do that is to determine SINR (Signal-to-Interference-and-Noise Ratio) based on one or more channel estimates H determined from CSI-RS for channel measurements and one or more interference and noise covariance matrices Q determined from CSI-RS and/or CSI-IM for interference measurement. For a MMSE (Minimum-Mean-Square-Error) receiver the SINR for layer l of a pre-coder P can be determined as:

$$R = (HPP^*H^* + Q)$$

$$W = P^*H^*R^{-1}$$

$$Q_x = I - WHP + WQW^*$$

$$SINR_l(P) = \frac{([WHP]_{l,l})^2}{[Q_x]_{l,l}}$$

In the above formulas * means Hermitian conjugate and $[\bullet]_{l,l}$ denotes l-th diagonal element.

The SINR per layer can be mapped to a Bits-Per-Symbol (BPS) value (usually referred to as mutual information) specifying how many information bits each modulation symbol can carry given a certain error rate. Summing the BPS values over the layers, the number of bits per symbol that the pre-coder P supports can be obtained. To report RI, PMI and CQI, the UE would typically loop through all pre-coders in a pre-coder codebook to determine the pre-coder that gives the highest sum of BPS. From the best pre-coder in the codebook, the RI and PMI can be obtained and the CQI may be a quantized measure of average BPS value of the associated layers.

The above shows at a high level how a UE may determine CSI and there are certainly different methods and computation optimizations that a UE can use in implementations. However, we can observe that if the pre-coder codebook is large, then the task of determining CSI may be a challenging computation task for the UE since the calculations involves matrix operations (especially multiplication and inverse operations).

SUMMARY

As previously indicated, the time-domain CSI reference resource for CSI reporting in uplink slot n' is defined by a single downlink slot n-n$_{CSI\_ref}$, where n$_{CSI\_ref}$ for periodic and semi-static CSI reporting is the smallest value greater or equal to 4·2$^{\mu_{DL}}$ or 5·2$^{\mu_{DL}}$ for single or multiple CSI-RS/SSB resource, respectively. The reported CSI thus corresponds to the channel state as it were at least 4·2$^{\mu_{DL}}$ or 5·2$^{\mu_{DL}}$ slots ago, which is due to CSI computation delay. Hence, the CSI is a rather inaccurate measure when it is received by the gNB.

Accordingly, embodiments of inventive concepts described herein provide for a UE performing CSI reporting for (fewer or selective or smaller set of) subband(s) with or without the need for CSI reporting for wideband or large set of subbands. This can curtail CSI computation delay or CSI reporting message size or both, e.g., If UE does not estimate CSI related information over wideband or a large set of subbands, then CSI computation delay is reduced, or If UE does not report wideband or large set of subbands related information in the CSI reporting, then message size is reduced.

This is useful for low latency scenarios where transmissions can or are limited to some subbands and there is no need for CSI estimation over wideband.

According to some embodiments of inventive concepts, a method in a user equipment, UE, for reporting channel state information, CSI, to a network is provided. The method includes determining a number of subbands of a bandwidth part, BWP, to report CSI. The method includes determining a CSI computation time including a CSI computation delay requirement. The method includes performing CSI estimation for a plurality of the number of subbands based on the CSI computation time. The method includes reporting the CSI report for at least one of the number of subbands.

Advantages that can be achieved using the inventive concepts is that CSI reporting can be enabled following the fast CSI timeline requirement for CSI involving sub-band CSI.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIGS. 4-9 are flow charts illustrating operations of a user equipment according to some embodiments of inventive concepts;

FIG. 15 is a block diagram of methods implemented in a communication system including a host computer, a base station and a user equipment in accordance with some embodiments;

FIG. 16 is a block diagram of methods implemented in a communication system including a host computer, a base station and a user equipment in accordance with some embodiments;

FIG. 17 is a block diagram of methods implemented in a communication system including a host computer, a base station and a user equipment in accordance with some embodiments; and FIG. 18 is a block diagram of methods implemented in a communication system including a host computer, a base station and a user equipment in accordance with some embodiments.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 1:
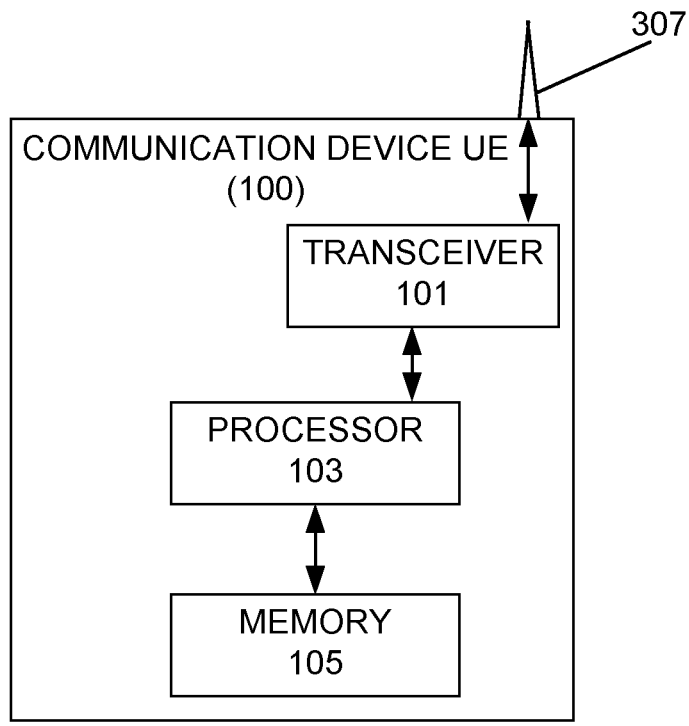
FIG. 1 is a block diagram illustrating a wireless device UE according to some embodiments of inventive concepts.

FIG. 1 is a block diagram illustrating elements of a communication device UE 100 (also referred to as a mobile terminal, a mobile communication terminal, a wireless device, a wireless communication device, a wireless terminal, mobile device, a wireless communication terminal, user equipment, UE, a user equipment node/terminal/device, etc.) configured to provide wireless communication according to embodiments of inventive concepts. (UE 100 may be provided, for example, as discussed below with respect to wireless device 4110 of FIG. 10.) As shown, UE may include an antenna 107 (e.g., corresponding to antenna 4111 of FIG. 10), and transceiver circuitry 101 (also referred to as a transceiver, e.g., corresponding to interface 4114 of FIG. 10) including a transmitter and a receiver configured to provide uplink and downlink radio communications with a base station(s) (e.g., corresponding to network node 4160 of FIG. 10, also referred to as a RAN node) of a radio access network. The UE may also include processing circuitry 103 (also referred to as a processor, e.g., corresponding to processing circuitry 4120 of FIG. 10) coupled to the transceiver circuitry, and memory circuitry 105 (also referred to as memory, e.g., corresponding to device readable medium 4130 of FIG. 10) coupled to the processing circuitry. The memory circuitry 105 may include computer readable program code that when executed by the processing circuitry 103 causes the processing circuitry to perform operations according to embodiments disclosed herein. According to other embodiments, processing circuitry 103 may be defined to include memory so that separate memory circuitry is not required. The UE 100 may also include an interface (such as a user interface) coupled with processing circuitry 103, and/or UE 100 may be incorporated in a vehicle.

As discussed herein, operations of the UE 100 may be performed by processing circuitry 103 and/or transceiver circuitry 301. For example, processing circuitry 303 may control transceiver circuitry 101 to transmit communications through transceiver circuitry 101 over a radio interface to a radio access network node (also referred to as a base station) and/or to receive communications through transceiver circuitry 101 from a RAN node over a radio interface. Moreover, modules may be stored in memory circuitry 105, and these modules may provide instructions so that when instructions of a module are executed by processing circuitry 103, processing circuitry 103 performs respective operations (e.g., operations discussed below with respect to Example Embodiments relating to UEs). According to some embodiments, a UE 100 and/or an element(s)/function(s) thereof may be embodied as a virtual node/nodes and/or a virtual machine/machines.

Figure 2:
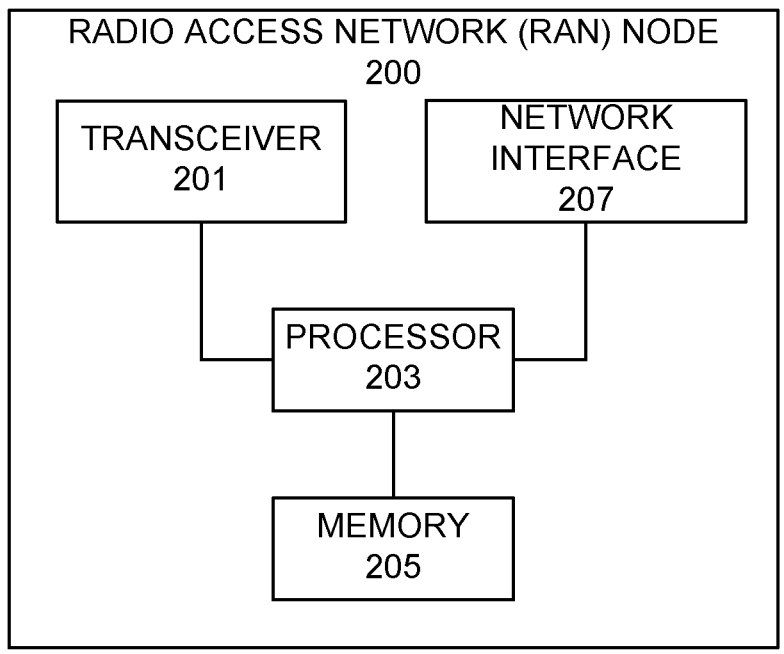
FIG. 2 is a block diagram illustrating a radio access network RAN node (e.g., a base station eNB/gNB) according to some embodiments of inventive concepts.

FIG. 2 is a block diagram illustrating elements of a radio access network RAN node 400 (also referred to as a network node, base station, eNodeB/eNB, gNodeB/gNB, etc.) of a Radio Access Network (RAN) configured to provide cellular communication according to embodiments of inventive concepts. (RAN node 200 may be provided, for example, as discussed below with respect to network node 4160 of FIG. 10.) As shown, the RAN node may include transceiver circuitry 201 (also referred to as a transceiver, e.g., corresponding to portions of interface 4190 of FIG. 10) including a transmitter and a receiver configured to provide uplink and downlink radio communications with mobile terminals. The RAN node may include network interface circuitry 207 (also referred to as a network interface, e.g., corresponding to portions of interface 4190 of FIG. 10) configured to provide communications with other nodes (e.g., with other base stations) of the RAN and/or core network CN. The network node may also include processing circuitry 203 (also referred to as a processor, e.g., corresponding to processing circuitry 4170) coupled to the transceiver circuitry, and memory circuitry 205 (also referred to as memory, e.g., corresponding to device readable medium 4180 of FIG. 10) coupled to the processing circuitry. The memory circuitry 205 may include computer readable program code that when executed by the processing circuitry 203 causes the processing circuitry to perform operations according to embodiments disclosed herein. According to other embodiments, processing circuitry 203 may be defined to include memory so that a separate memory circuitry is not required.

As discussed herein, operations of the RAN node may be performed by processing circuitry 203, network interface 207, and/or transceiver 201. For example, processing circuitry 203 may control transceiver 201 to transmit downlink communications through transceiver 201 over a radio interface to one or more mobile terminals UEs and/or to receive uplink communications through transceiver 201 from one or more mobile terminals UEs over a radio interface. Similarly, processing circuitry 203 may control network interface 407 to transmit communications through network interface 207 to one or more other network nodes and/or to receive communications through network interface from one or more other network nodes. Moreover, modules may be stored in memory 205, and these modules may provide instructions so that when instructions of a module are executed by processing circuitry 403, processing circuitry 203 performs respective operations (e.g., operations discussed below with respect to Example Embodiments relating to RAN nodes). According to some embodiments, RAN node 200 and/or an element(s)/function(s) thereof may be embodied as a virtual node/nodes and/or a virtual machine/machines.

According to some other embodiments, a network node may be implemented as a core network CN node without a transceiver. In such embodiments, transmission to a wireless communication device UE may be initiated by the network node so that transmission to the wireless communication device UE is provided through a network node including a transceiver (e.g., through a base station or RAN node). According to embodiments where the network node is a RAN node including a transceiver, initiating transmission may include transmitting through the transceiver.

Figure 3:
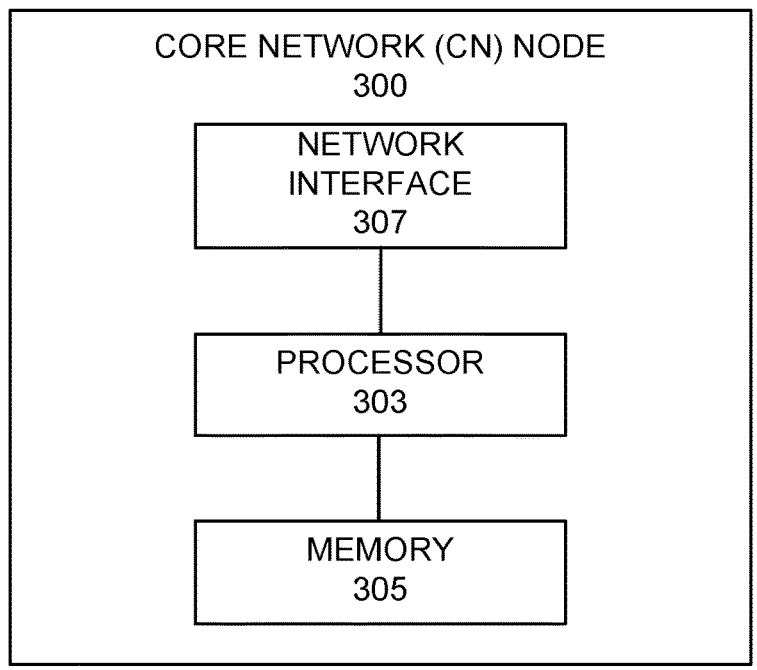
FIG. 3 is a block diagram illustrating a core network CN node (e.g., an AMF node, an SMF node, etc.) according to some embodiments of inventive concepts.

FIG. 3 is a block diagram illustrating elements of a core network CN node (e.g., an SMF node, an AMF node, etc.) of a communication network configured to provide cellular communication according to embodiments of inventive concepts. As shown, the CN node may include network interface circuitry 307 (also referred to as a network interface) configured to provide communications with other nodes of the core network and/or the radio access network RAN. The CN node may also include a processing circuitry 303 (also referred to as a processor) coupled to the network interface circuitry, and memory circuitry 305 (also referred to as memory) coupled to the processing circuitry. The memory circuitry 305 may include computer readable program code that when executed by the processing circuitry 303 causes the processing circuitry to perform operations according to embodiments disclosed herein. According to other embodiments, processing circuitry 303 may be defined to include memory so that a separate memory circuitry is not required.

As discussed herein, operations of the CN node may be performed by processing circuitry 303 and/or network interface circuitry 307. For example, processing circuitry 303 may control network interface circuitry 307 to transmit communications through network interface circuitry 307 to one or more other network nodes and/or to receive communications through network interface circuitry from one or more other network nodes. Moreover, modules may be stored in memory 305, and these modules may provide instructions so that when instructions of a module are executed by processing circuitry 303, processing circuitry 303 performs respective operations (e.g., operations discussed below with respect to Example Embodiments relating to core network nodes). According to some embodiments, CN node 300 and/or an element(s)/function(s) thereof may be embodied as a virtual node/nodes and/or a virtual machine/machines.

As previously indicated, the time-domain CSI reference resource for CSI reporting in uplink slot n' is defined by a single downlink slot n-nCSI_ref, where nCSI_ref for periodic and semi-static CSI reporting is the smallest value greater or equal to $4\cdot2^{\mu_{DL}}$ or $5\cdot2^{\mu_{DL}}$ for single or multiple CSI-RS/SSB resource, respectively. The reported CSI thus corresponds to the channel state as it were at least $4\cdot2^{\mu_{DL}}$ or $5\cdot2^{\mu_{DL}}$ slots ago, which is due to CSI computation delay. Hence, the CSI is rather in-accurate measure when it is received by the gNB.

For a-periodic CSI reporting short CSI latency, but only by obeying the limitations for fast CSI processing, i.e. only by obeying the following limitation to get CSI computation delay requirement 1 according to Table 5.4-1 of TS 38.214:

$(Z_1,Z'_1)$ of the table 5.4-1 if the CSI is triggered without a PUSCH with either transport block or HARQ-ACK or both when L=0 CPUs are occupied (according to Clause 5.2.1.6) and the CSI to be transmitted is a single CSI and corresponds to wideband frequency-granularity where the CSI corresponds to at most 4 CSI-RS ports in a single resource without CRI report and where CodebookType is set to 'typeI-SinglePanel' or where reportQuantity is set to 'cri-RI-CQI'

Computation Delay Subject to Subband Configuration

The CSI computation delay requirement $Z_1$, and their primes $Z'_1$, are for CSI with wideband frequency granularity. In various embodiments of inventive concepts, some relaxations are used such that the CSI computation delay requirements $Z_1$, and their primes $Z'_1$, are also applicable for CSI with subband frequency granularity.

For example, in one non-limiting embodiment of inventive concepts, these $(Z_1,Z'_1)$ values can be applied for CSI reporting with subband granularity as well, e.g., the Z values can be applied when the UE reports CSI for two or multiple (i.e., n) subband(s).

In another embodiment of inventive concepts, the requirement for applying $(Z_1,Z'_1)$ (see 38.214 V16.2.0 table 5.4-1 and table 5.4-2) is relaxed to allow subband reporting for a CSI report. For example:

when reportQuantity is set to 'cri-RI-PMI-CQI', or 'cri-RI-LI-PMI-CQI', PMI reporting is wideband, CQI reporting is subband. This corresponds to RRC configuration of: pmi-FormatIndicator=widebandPMI and cqi-FormatIndicator=subbandCQI.

when reportQuantity is set to 'cri-RI-PMI-CQI', or 'cri-RI-LI-PMI-CQI', PMI reporting is subband, CQI reporting is wideband. This corresponds to RRC configuration of: pmi-FormatIndicator=subbandPMI and cqi-FormatIndicator=widebandCQI.

when reportQuantity is set to 'cri-RI-CQI' or 'cri-RI-i1-CQI', CQI reporting is subband. This corresponds to RRC configuration of: cqi-FormatIndicator=subbandCQI.

In yet another embodiment of inventive concepts, the relaxation proposed above is only applied when the UE is configured or triggered dynamically to measure CSI on a number of subbands that do not exceed a threshold $N_{subband,th}$. The threshold value $N_{subband,th}$ may be dependent on the BWP size, the configured subband size or both. In some embodiments of this embodiment of inventive concepts, the threshold value $N_{subband,th}$ may be predefined in 3GPP specifications (e.g., one predefined threshold value per BWP size and/or configured subband size). In some other embodiments of inventive concepts, the threshold value $N_{subband,th}$ may be configured as part of CSI-ReportConfig by higher layer configuration (e.g., RRC).

In another variant of inventive concepts, the computation delay requirement (i.e., $Z_1$, $Z_2$, $Z_3$ and their primes $Z'_1$, $Z'_2$, $Z'_3$) scales with the sum of total number of PRBs that are configured by the network to evaluate and report. Then two values are needed: the first value of a baseline number related with the minimum number of PRBs (such as 24 PRBs); and the second value of how it scales up with the additional number of PRBs beyond the minimum number (such as 24 PRBs). If the first value is denoted by x, the second value is denoted by y and the total number of PRBs is N, then the computation delay requirement is x+(N−24)*y In yet another variant of the inventive concepts, the computation delay requirement (i.e., $Z_1$, $Z_2$ and their primes $Z'_1$, $Z'_2$) scales with a combination of one or more of the sum of total number of PRBs, the number of antenna ports, the number of subbands that are configured by the network to evaluate and report.

On Selection of Subbands and Report Quantity

A. In first embodiments of various inventive concepts, for a given BWP, a maximum of N subbands are available. Hence, in one non-limiting embodiment, various options can be devised on CSI estimation for the plurality of subbands and their reporting to the gNB. These options include:

1. UE performs CSI estimation across N subbands.
   a. UE reports wideband CQI and/or PMI (across N subbands), subband CQIs and/or PMI for M subbands, where the M<N subbands can either be signaled to the UE or is determined by the UE.
   b. UE reports subband CQIs and/or PMI for M subbands, where M<N.

c. UE reports a wideband PMI, CQI and RI, and a subband CQI with the lowest CSI index conditioned on the wideband PMI and RI. This would be useful for the case where only a small portion of the bandwidth need to be allocated for a packet transmission and the worst case CQI would allow the gNB to schedule the transmission reliably by knowing the worst case CQI.

2. In the above options, the wideband and/or subband CQIs can be differentially encoded to reduce reporting overhead. Examples of this include:

a. UE reports CQI for the best subband that may be selected by the UE
  i. The remaining subband CQIs (N−1 or M−1 quantities in above options) and wideband CQI (if indicated) can be reported in the form of differential encoding (e.g., their CQI values could be derived as the difference from the reported value for the best subband) to reduce overhead. In some embodiments, the index of the best subband may also be reported by the UE as part of the CSI feedback. UE indicates this in the UL by a bit map which has the same length as the field csi-ReportingBand in the CSI report configuration. Each bit in the UL bitmap indicates the same subband as the field csi-ReportingBand. In this bit map, one means that this subband is included in the report and zero means that this subband is not included in the report. The additional bitmap report can be part of the CSI feedback and can be added either in the beginning or in the end of the CSI feedback.

(e.g., their CQI values could be derived as the difference from the reported CQI value for the worst subband). In some embodiments, the index of the worst subband may also be reported by the UE as part of the CSI feedback. The same approach to indicate which subband is indicated as the one above is used.

3. In above options the M subbands can be indicated in the following non-limiting options. The number N subbands is determined by the bandwidth of the BWP and the RRC configurable field subbandSize. The network configures M subbands to evaluate.

a. In the first embodiment, which subband to report CSI for is indicated by the gNB to the UE. gNB indicates the subbands identity in the DL signaling (by one or more of DCI, MAC CE and RRC signaling) for which UE should report CSI.

If indicated by DCI, each code point of a field in DCI points to a row of a RRC-configurable table, in which each row indicates the subbands to report. In one embodiment, a new field reportFreqConfigurationList-rX field is introduced in CSI-ReportConfig as shown in the example below. If the UE is configured with reportFreqConfigurationList-rX it ignores the legacy field reportFreqConfiguration in CSI-ReportConfig. Each of the CSI-reportFreqConfiguration-rX in the list CSI-FreqReportList-rX corresponds to a codepoint in a field in DCI. The IE CSI-reportFreqConfiguation-rx is the same as the one in Rel-16. In some embodiments, the field in DCI may be a new field introduced in DCI formats 01 or 0_1.

```
-- ASN1START
-- TAG-CSI-REPORTCONFIG-START
CSI-ReportConfig ::=                             SEQUENCE {
  ...
    reportFreqReportList-rX                      CSI-FreqReportList-rX
  OPTIONAL    -- Need S
  ...
}
CSI-FreqReportList-rX ::= SEQUENCE(SIZE (1..maxNrOfCSIFreqReport-
Triggers)) OF CSI-reportFreqConfiguration-rX
CSI-reportFreqConfiguration-rX ::= SEQUENCE {            cqi-FormatIndicator
        ENUMERATED { widebandCQI, subbandCQI }           OPTIONAL,  --
Need R                                          pmi-FormatIndicator ENUMERATED { widebandPMI,
subbandPMI }                                    OPTIONAL,  -- Need R
    csi-ReportingBand                                    CHOICE {
       subbands3                                          BIT STRING(SIZE(3)),
       subbands4                                          BIT STRING(SIZE(4)),
       subbands5                                          BIT STRING(SIZE(5)),
       subbands6                                          BIT STRING(SIZE(6)),
       subbands7                                          BIT STRING(SIZE(7)),
       subbands8                                          BIT STRING(SIZE(8)),
       subbands9                                          BIT STRING(SIZE(9)),
       subbands10                                         BIT STRING(SIZE(10)),
       subbands11                                         BIT STRING(SIZE(11)),
       subbands12                                         BIT STRING(SIZE(12)),
       subbands13                                         BIT STRING(SIZE(13)),
       subbands14                                         BIT STRING(SIZE(14)),
       subbands15                                         BIT STRING(SIZE(15)),
       subbands16                                         BIT STRING(SIZE(16)),
       subbands17                                         BIT STRING(SIZE(17)),
       subbands18                                         BIT STRING(SIZE(18)),
       ...,
       subbands19-v1530                                   BIT STRING(SIZE(19))
``` b. UE reports CQI for the worst subband that may be selected by the
UE., The following sub-options may be used:
  i. The remaining subband CQIs (N−1 or M−1 quantities in above options) and wideband CQI (if indicated) can be reported in the form of differential encoding In another embodiment, the length of the CSI-FreqReportList-rX can be long and a MAC CE can be used to dynamically switch which subset of the list is activated. The size of the subset is equal to two to the power of the DCI fields to indicate the CSI report frequency configuration. For example, the MAC CE is a bit map of the length of the CSI-FreqReportList-rX and if it is one, then it means that it is included as in the subset which can be indicated by the DCI.

In another embodiment, network configures a subband configuration for UE to measure and report. UE can choose to measure a subset of the subbands, and the size of the subset is indicated by the DCI or MAC CE. Therefore, RRC configuration would be that only a separate field of subset-Size is needed in addition to the rel-16 filed csi-ReportFreqConfiguration. One example is shown below with the additional field subsetSize.

```
CSI-ReportConfig ::=        SEQUENCE {
  ...
  reportFreqConfiguration Sequence {..} OPTIONAL
  subsetSize-rx Enumerated {N1, N2, N3, N4} OPTIONAL
  ...
}
```

There are four candidate values N1, N2, N3, N4. They are all integers and be smaller than the number of bits that are set to one in the csi-ReportingBand. The size of the subset is indicated by DCI or MAC CE. Depending on the subset size, there is a different UE computation delay requirement as illustrated above.

If indicated by MAC CE, a bit-map is indicated in the DL MAC CE, with one bit representing one subband. If a bit in the MAC CE bitmap is set to one, then the corresponding PMI and/or CQCI needs to be reported for that subband. The MAC CE bitmap size ranges from 3 bit to 18 bits. For i-th bandwidth part of size $N_{BWP,i}^{size}$ PRBs, and a subband size of $N_{PRB}^{SB}$ PRBs, there are $\lceil N_{BWP,i}^{size}/N_{PRB}^{SB} \rceil$ subbands, and the bitmap is composed of $\lceil N_{BWP,i}^{size}/N_{PRB}^{SB} \rceil$ bits. To enable the MAC CE signaled subband, a new MAC CE type is to be introduced, where the MAC CE size can be 1 byte, 2 byte or 3 byte. The MAC CE size depends on the subband string size (e.g., up to 18 bits), which in turn depends on the BWP size. The MAC CE also contains other fields such as serving cell ID, CSI Report Config ID, and BWP ID related to the CSI report.

There can be a couple of further options in these embodiments of inventive concepts: These options include:

Further variations could be, for instance the DCI can simultaneously schedule a PDSCH and also trigger the CSI reporting. This variant is further described in Embodiment C below.

Additionally, the network configures only the number of subbands for UE to evaluate/report, while the UE chooses the M subbands out-of the N subbands to report using the below option b. Some further variations can be that DCI only indicates how many subbands UE shall report (i.e., the number M). This can also be signaled by MAC CE if there is a limitation on the DCI fields.

b. Network configures only the number of subbands for UE to evaluate/report, while the UE chooses the M preferred subbands out-of the N subbands to report. In one embodiment, the UE indicates in the CSI report a bit-map with length N of which M bits are set to one to indicate which subbands are chosen. Another way to indicate which subbands are reported is to enumerate the subsets of size L and indicate which subset is being reported. For example, if there are 4 subbands, and the UE shall report 2 subbands, the subsets can be {{1,2}, {1, 3}, {1, 4}, {2, 3}, {2, 4}, {3, 4}} and this can be reported using 3 bits compared to the bitmap that needs 4 bits. For arbitrary N and M combinations, the ordering of the subsets should be provided. In yet a further embodiment, the UE reports the positions of the M selected subbands using a combinatorial index r defined as $$r = \sum_{i=0}^{M-1} \binom{N - s_i}{M - i},$$

where the set $\{s_i\}_{i=0}^{M-1}$, ($1 \leq s_i \leq N$, $s_i < s_{i+1}$) contains the M sorted subband indices and $$\binom{x}{y} = \begin{cases} \binom{x}{y} & x \geq y \\ 0 & x < y \end{cases}$$

is the extended binomial coefficient, resulting in unique label $$r \in \left\{0, ..., \binom{N}{M} - 1\right\}.$$

In some further embodiments, the UE can select the sub-bands using the following methods:

i. Based on history, for instance UE analyses last T reporting and concludes based on it, for instance by averaging or weighted averaging the CQI values.

ii. Based on last reporting
  1. For instance, if UE has previously reported CQIs for M subbands, and if UE is asked again to report CQIs for M subbands, then UE can pick the same subbands for the analysis. A timer can be configured where if this new reporting happens within a small interval and/or this new reporting does not vary or deviate much (i.e., deviation or variance or percentage change is within some threshold) wrt the pervious one, then UE can go ahead with same selection or subset of M subbands (if the requirement is lesser than M subbands reporting).

4. In one option, the minimum number of selected subbands either for evaluation or reporting can be 1 (which can be indicated by DCI, MAC CE or RRC based). This is achieved by limiting the bit strings in csi-ReportingBand to have only 1 bit equal to 1, with the other (N−1) bits equal to 0. Here N is the bit string size and equal to $\lceil N_{BWP,i}^{size}/N_{PRB}^{SB} \rceil$. Other signaling method can achieve the same effect, for example, signaling the subband index, which requires ceil($\log_2$(N)) bits instead of N bits.

5. Based on configurations dictated by above options, new reduced values for CSI computation delay symbols Z1, Z2, Z3 and their primes can be specified.

B. In second embodiments of various inventive concepts, if a UE is configured to evaluate fewer subbands (as discussed in above options), then a timer is configured. After UE is triggered by the network to report (such as by DCI or MAC CE), the timer is started, and the UE can be allowed to perform reporting on fewer subbands. Upon the expiry of the timer, UE resumes to existing Rel-16 behavior, e.g., the UE reports CSI according to Rel-16 RRC parameters such as csi-ReportingBand.

C. In third embodiments of various inventive concepts, a DL DCI assigns a PDSCH transmission in a set S of PRBs and the DL DCI also indicates a CSI request of a-periodic CSI report (on PUCCH). In these embodiments, the UE determines a sub-set of the subbands configured for the CSI measurement resources of CSI report configuration for which CSI is requested, wherein the sub-set of subbands are those subbands that at least partly overlaps (in frequency domain) with the set S. In some examples of this embodiment, the CSI reported is conditioned to the same rank and/or pre-coder that was last reported for this CSI report configuration. In such examples, legacy CSI reported may be used to evaluate other subbands (than used by PDSCH) wherein said CSI report configuration may also be triggered for CSI reporting (on PUSCH) by a UL DCI indicating a CSI request wherein the reported CSI when triggered by UL DCI is un-conditioned last reported rank and/or pre-coder and may be evaluated on all subbands for the CSI measurement resources. In some examples of this embodiment, if the CSI report is triggered by DL DCI and the rank and/or pre-coder are conditioned to be same as last reported a first CSI computation delay requirement (i.e., first values of Z and Z') is used while if CSI report is un-conditioned (all ranks/pre-coders are evaluated) last reported rank and/or pre-coder a second CSI computation delay requirement is used. The first CSI computation delay requirement may in some embodiments even comprise lower values than for CSI computation delay requirement 1.

D. In fourth embodiments of various inventive concepts, the number of subbands to report CSI on is reduced by introducing larger subband sizes (PRBs). For example, one additional subband size choices (shown in bold/italicized) are introduced to reduce the number of subbands by about 50%.

TABLE 1

Configurable subband sizes

| Bandwidth part (PRBs) | Subband size (PRBs) |
|---|---|
| 24-72 | 4, 8, _16_ |
| 73-144 | 8, 16, _32_ |
| 145-275 | 16, 32, _64_ |

This requires the RRC parameter subbandSize to expand to include 'value3' as shown below:
subbandSize ENUMERATED {value1, value2, value3},
Correspondingly, the CSI reporting band needs to expand to include the choice of Subbands2 with bit string size of 2, as illustrated below.
csi-ReportingBand CHOICE {
Subbands2 BIT STRING(SIZE(2)),
The example illustrated above is not limiting. Following the same methodology, other subband sizes can also be used.

E. In fifth embodiments of various inventive concepts, a new CSI reporting type can be introduced to limit the subband CSI reporting to odd subbands only. Alternatively, the CSI reporting can be limited to even subbands only. While currently it is possible that odd vs even subbands reporting may occur when applying priority levels for part 2 CSI, the modification here means that: CSI only need to be generated for odd (or even) subbands, and this does not depend on the priority reporting levels.

Determining CSI Reference Resource when M Out of N Subbands are Indicated

When CSI is reported for a sub-set (size M) of the N subbands, i.e. M<N, and UE is indicated (DCI or MAC CE) which of the M out of N subbands that shall be evaluated, then UE may or may not assume that the other N-M subbands comprise CSI measurement resources. More precisely, if UE is indicated M<N subbands to evaluate for CSI, the UE may assume (or not assume) that the CSI reference resource in frequency domain only consists of the those indicated M subbands. In such a case, the UE may further assume that the resource elements used for CSI-RS/IM in those M subbands are not used and hence are used for PDSCH transmission. Such optimization could likely only be expected if the DCI indicating the M subbands is expected to be decoded some time before the start of the start symbol of the PDSCH in order for the UE to properly adjust PDSCH rate-matching. For example, UE may assume that CSI-RS/IM is not present in N-M subbands overlapping the PDSCH if and only if the PDCCH carrying the DCI indicating the M subbands ends in symbol n and the PDSCH starts in symbol m are such that m≥n+p for some processing time p.

On CSI-RS Configuration

In the embodiments described above, a few subbands can be scanned for CSI-reporting instead of all. The resultant CSI-RS can be configured with a span
a. across the BWP, or
b. portion of BWP or subset of subbands
c. of single periodicity across the BWP
d. of different periodicities in different portions of BWP or in different subbands Operations of the user equipment 100 (implemented using the structure of the block diagram of FIG. 1) will now be discussed with reference to the flow chart of FIG. 4 according to some embodiments of inventive concepts. For example, modules may be stored in memory 105 of FIG. 1, and these modules may provide instructions so that when the instructions of a module are executed by respective communication device processing circuitry 103, processing circuitry 103 performs respective operations of the flow chart.

Figure 4:
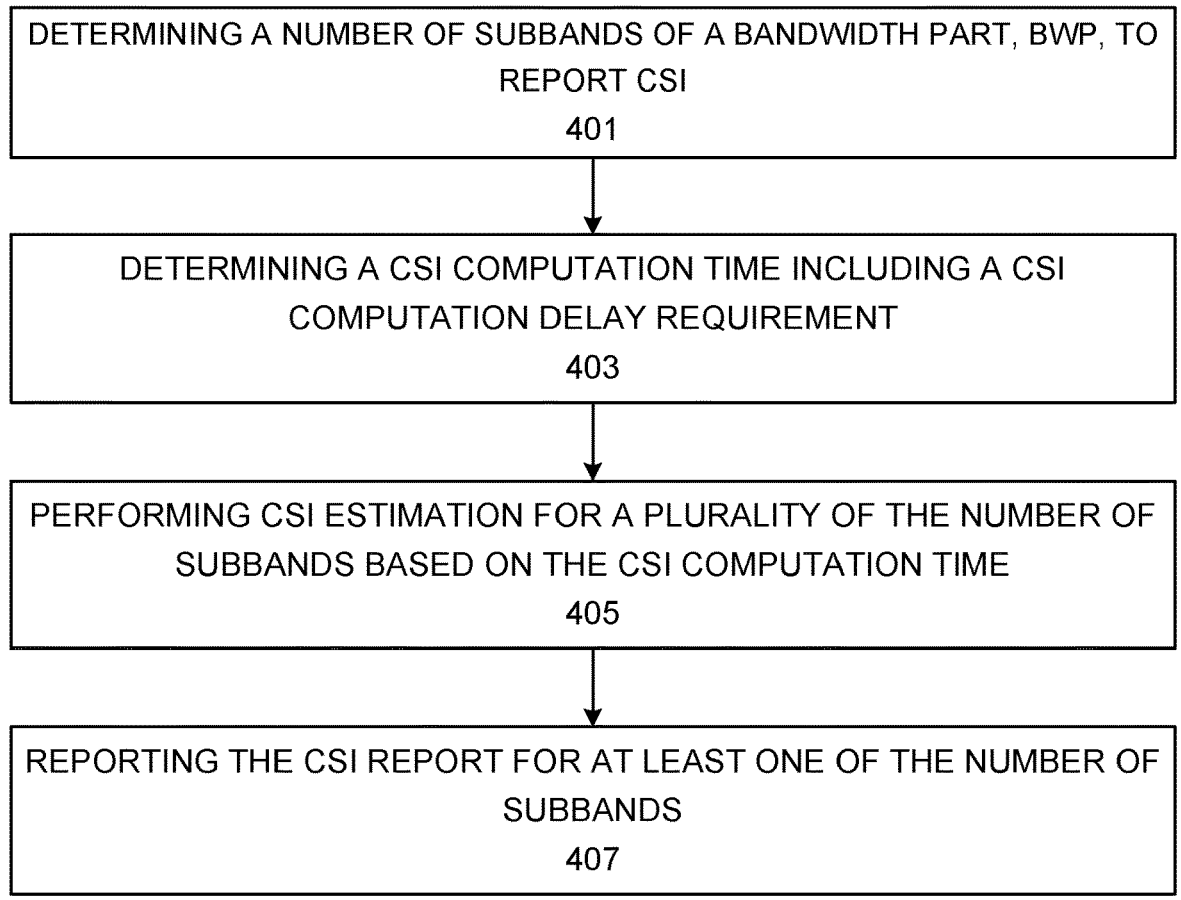

Turning to FIG. 4, in block 401, the processing circuitry 103 determines a number of subbands of bandwidth part, BWP, to report CSI. In some embodiments, the processing circuitry 103 determines the number of subbands of the BWP by determining the number of subbands by the bandwidth of the BWP and a radio resource control, RRC, configurable field subbandSize.

In other embodiments of inventive concepts, the network configures a subband configuration for the UE to measure and report and the processing circuitry 103 determines the number of subbands of a BWP to report CSI by selecting a subset of subbands wherein a size of the subset is indicated by DCI or MAC CE.

In block 403, the processing circuitry 103 determines a CSI computation time including a CSI computation delay requirement. In some embodiments of inventive concepts, determining the CSI computation time comprises determining the CSI computation delay requirement.

The processing circuitry 103 may determine the CSI computation delay in some embodiments by applying CSI computation delay requirement $Z_1$ and their primes $Z'_1$ for wideband frequency granularity to subband frequency granularity.

In other embodiments, the processing circuitry 103 applies $Z_1$ and $Z'_1$ when the UE reports CSI for two or more subbands. In yet other embodiments, the processing circuitry 103 applies $Z_1$ and $Z'_1$ for subband reporting for a CSI report.

Turning to FIG. 5, applying $Z_1$ and $Z'_1$ for subband reporting for a CSI report includes, responsive to a reportQuantity being set to 'cri-RI-PMI-CQI', or 'cri-RI-LI-PMI-CQI', determining by the processing circuitry 103 in block 501 that pre-coding matrix indicator, PMI, reporting is wideband and channel quality indicator, CQI, reporting is subband using $Z_1$ and $Z'_1$. In block 503, the processing circuitry 103, responsive to the reportQuantity being set to 'cri-RI-PMI-CQI', or 'cri-RI-LI-PMI-CQI', determines that PMI reporting is subband using $Z_1$ and $Z'_1$, and CQI reporting is wideband. In block 505, the processing circuitry 103, responsive to the reportQuantity being set to 'cri-RI-CQI' or 'cri-RI-i1-CQI', determines that CQI reporting is a subband CQI with a lowest CQI index (e.g., worst case CQI among the subband CQIs) in addition to wideband PMI and CQI using $Z_1$ and $Z'_1$.

In other embodiments of inventive concepts, the processing circuitry 103 applies $Z_1$ and $Z'_1$ only when the UE is configured to or triggered dynamically to measure CSI on a number of subbands that do not exceed a threshold $N_{subband, th}$ as indicated above.

In some embodiments of inventive concepts, the CSI computation delay requirement scales with a sum of a total number of physical resource blocks, PRBs, that are configured by the network to evaluate and report.

In other embodiments of inventive concepts, the CSI computation delay requirement scales with a combination of a sum of a total number of physical resource blocks, PRBs, a number of subbands, and a number of antenna ports in CSI resources that are configured by the network to evaluate and report.

Returning to FIG. 4, in operation 405, the processing circuitry 103 performs CSI estimation for a plurality of the number of subbands based on the CSI computation time. In block 407, the processing circuitry 103 reports the CSI report for at least one of the number of subbands.

In some embodiments, the processing circuitry 103 reports the CSI report for the at least one of the number of subbands by reporting the CSI report for a subband indicated by a radio access network, RAN, node. The processing circuitry 103 may receive an identity of the subband indicated by the RAN node by one or more of downlink control information, DCI, media access control-control element, MAC CE, and RRC signaling.

In some other embodiments, the processing circuitry 103 receives the identity by receiving the identity by DCI, wherein each code point of a field in DCI points to a row of a RRC-configurable table, in which each row indicates the subbands to report.

In yet other embodiments, the processing circuitry 103 receives the identity by receiving the identity by MAC-CE dynamically switching which subset of a list comprising a CSI-FreqReportList is activated. In another embodiment, a bitmap is indicated in the MAC-CE with one bit representing one subband.

In some embodiments, for a given BWP, a maximum N subbands are available. the processing circuitry 103 may perform CSI estimation for the number of subbands by performing CSI estimation across the N subbands. The processing circuitry 103 may report the CSI report by reporting wideband CQI and/or PMI across N subbands, subband CQIs and/or PMI for M subbands, where the M<N subbands are one of signaled to the ULE or determined by the UE.

In other embodiments where a maximum number N subbands are available for a given BWP, the processing circuitry 103 may perform CSI estimation across the N subbands and report the CSI report by reporting subband CQIs and/or PMI for M subbands, where M<N.

In yet other embodiments where a maximum number N subbands are available for a given BWP, the processing circuitry 103 may perform CSI estimation across the N subbands and report the CSI report by reporting a wideband PMI, CQI and rank indicator, RI, and a subband CQI with the lowest CSI index conditioned on the wideband PMI and the RI.

In reporting the subband CQI, the processing circuitry 103 may report CQI for a best subband and reporting remaining subband CQIs in a form of differential encoding as described above. In an alternate embodiment, the processing circuitry 103 may report CQI for a worst subband and reporting remaining subband CQIs in a form of differential encoding as described above.

Turning to FIG. 6, in some embodiments of inventive concepts, if a UE is configured to evaluate fewer subbands (as discussed above), then a timer is configured. Thus, in block 601, the processing circuitry 103, responsive to the UE being configured to evaluate a subset of subbands in the BWP and the UE is triggered by the network to report, starts a timer. In block 603, the processing circuitry 103 performs reporting on the subset of subbands responsive to the timer not being expired. Responsive to the timer being expired, the processing circuitry 103 resumes reporting CSI according to RRC parameters.

Turning to FIG. 7, in some embodiments of inventive concepts, the processing circuitry 103 in block 701 reduces the number of subbands to report CSI by the network providing larger subband sizes.

Turning to FIG. 8, in some embodiments of inventive concepts, the processing circuitry 103 may, in block 801, limit the subband CSI reporting to odd subbands only or even subbands only.

Turning to FIG. 9, a resultant CSI-RS can be configured with a span. Thus, the processing circuitry 103 may receive a configuration of a resultant channel state information reference signal, CSI-RS, with a span: across the BWP in block 901; across a portion of the BWP or a subset of subbands in block 903; of single periodicity across the BWP in block 905; and of different periodicities in different portions of BWP or in different subbands in block 907.

Example embodiments are discussed below.

Embodiment 1. A method in a user equipment, UE, 100 for reporting channel state information, CSI, to a network, the method comprising:

determining (401) a number of subbands of a bandwidth part, BWP, to report CSI; determining (403) a CSI computation time including a CSI computation delay requirement;

performing (405) CSI estimation for a plurality of the number of subbands based on the CSI computation time; and reporting (407) the CSI report for at least one of the number of subbands.

Embodiment 2. The method of Embodiment 1 wherein determining the CSI computation time comprises determining the CSI computation delay requirement.

Embodiment 3. The method of Embodiment 2 wherein determining the CSI computation delay comprises applying CSI computation delay requirement $Z_1$ and their primes $Z'_1$ for wideband frequency granularity to subband frequency granularity.

Embodiment 4. The method of Embodiment 3 wherein applying $Z_1$ and $Z'_1$ comprises applying $Z_1$ and $Z'_1$ when the UE reports CSI for two or more subbands.

Embodiment 5. The method of Embodiment 3 wherein applying $Z_1$ and $Z'_1$ comprises applying $Z_1$ and $Z'_1$ for subband reporting for a CSI report.

Embodiment 6 The method of Embodiment 5 wherein applying $Z_1$ and $Z'_1$ for subband reporting for a CSI report comprises one of:

responsive to a reportQuantity being set to 'cri-RI-PMI-CQI', or 'cri-RI-LI-PMI-CQI', determining (501) that pre-coding matrix indicator, PMI, reporting is wideband and channel quality indicator, CQI, reporting is subband using $Z_1$ and $Z'_1$;

responsive to the reportQuantity being set to 'cri-RI-PMI-CQI', or 'cri-RI-LI-PMI-CQI', determining (503) that PMI reporting is subband using $Z_1$ and $Z'_1$, and CQI reporting is wideband; and responsive to the reportQuantity being set to 'cri-RI-CQI' or 'cri-RI-i1-CQI', determining (505) that CQI reporting is a subband CQI with a lowest CQI index in addition to wideband PMI and CQI using $Z_1$ and $Z'_1$.

Embodiment 7. The method of Embodiment 5 wherein applying $Z_1$ and $Z'_1$ for subband reporting for a CSI report comprises applying $Z_1$ and $Z'_1$ only when the UE is configured to or triggered dynamically to measure CSI on a number of subbands that do not exceed a threshold $N_{subband,th}$.

Embodiment 8. The method of any of Embodiments 2-7 wherein the CSI computation delay requirement scales with a sum of a total number of physical resource blocks, PRBs, that are configured by the network to evaluate and report.

Embodiment 9. The method of any of Embodiments 2-7 wherein the CSI computation delay requirement scales with a combination of a sum of a total number of physical resource blocks, PRBs, a number of subbands, and a number of antenna ports in CSI resources that are configured by the network to evaluate and report.

Embodiment 10. The method of any of Embodiments 1-9, wherein for a given BWP, a maximum N subbands are available, and wherein performing CSI estimation for the number of subbands comprises performing CSI estimation across the N subbands and reporting the CSI report comprises reporting wideband CQI and/or PMI across N subbands, subband CQIs and/or PMI for M subbands, where the M<N subbands are one of signaled to the UE or determined by the UE.

Embodiment 11. The method of any of Embodiments 1-9, wherein for a given BWP, a maximum N subbands are available, and wherein performing CSI estimation for the number of subbands comprises performing CSI estimation across the N subbands and reporting the CSI report comprises reporting subband CQIs and/or PMI for M subbands, where M<N.

Embodiment 12. The method of any of Embodiments 1-9, wherein for a given BWP, a maximum N subbands are available, and wherein performing CSI estimation for the number of subbands comprises performing CSI estimation across the N subbands and reporting the CSI report comprises reporting a wideband PMI, CQI and rank indicator, RI, and a subband CQI with the lowest CSI index conditioned on the wideband PMI and the RI.

Embodiment 13. The method of any of Embodiments 10-12 wherein reporting the subband CQI comprises reporting CQI for a best subband and reporting remaining subband CQIs in a form of differential encoding.

Embodiment 14. The method of any of Embodiments 10-12 wherein reporting the subband CQI comprises reporting CQI for a worst subband and reporting remaining subband CQIs in a form of differential encoding.

Embodiment 15. The method of any of Embodiments 1-14 wherein determining the number of subbands of the BWP comprises determining the number of subbands by the bandwidth of the BWP and a radio resource control, RRC, configurable field subbandSize.

Embodiment 16. The method of any of Embodiments 1-15 wherein reporting the CSI report for at least one of the number of subbands comprises reporting the CSI report for a subband indicated by a radio access network, RAN, node.

Embodiment 17. The method of Embodiment 16, further comprising receiving an identity of the subband indicated by the RAN node by one or more of downlink control information, DCI, media access control-control element, MAC CE, and RRC signaling.

Embodiment 18. The method of Embodiment 17, wherein receiving the identity of the subband indicated by the RAN node comprises receiving the identity by DCI, wherein each code point of a field in DCI points to a row of a RRC-configurable table, in which each row indicates the subbands to report.

Embodiment 19. The method of Embodiment 17 wherein receiving the identity of the subband indicated by the RAN node comprises receiving the identity by MAC-CE dynamically switching which subset of a list comprising a CSI-FreqReportList is activated.

Embodiment 20. The method of Embodiment 19, wherein a bitmap is indicated in the MAC-CE with one bit representing one subband.

Embodiment 21. The method of any of Embodiments 1-15 wherein the network configures a subband configuration for the UE to measure and report, wherein determining the number of subbands of a BWP to report CSI comprises selecting a subset of subbands wherein a size of the subset is indicated by DCI or MAC CE.

Embodiment 22. The method of any of Embodiments 1-21, further comprising: responsive to the UE being configured to evaluate a subset of subbands in the BWP and the UE is triggered by the network to report, starting (601) a timer;
performing (603) reporting on the subset of subbands responsive to the timer not being expired; and
responsive to the timer being expired, resuming (605) reporting CSI according to RRC parameters.

Embodiment 23. The method of any of Embodiments 1-22, further comprising reducing (701) the number of subbands to report CSI on by providing larger subband sizes.

Embodiment 24. The method of any of Embodiments 1-23, further comprising limiting (801) the subband CSI reporting to odd subbands only or even subbands only.

Embodiment 25. The method of any of Embodiments 1-24, further comprising receiving (901) a configuration of a resultant channel state information-reference signal, CSI-RS, with a span across the BWP.

Embodiment 26. The method of any of Embodiments 1-24, further comprising receiving (903) a configuration of a resultant channel state information-reference signal, CSI-RS, with a span across a portion of the BWP or a subset of subbands.

Embodiment 27. The method of any of Embodiments 1-24, further comprising receiving (905) a configuration a resultant channel state information-reference signal, CSI-RS, with a span of single periodicity across the BWP.

Embodiment 28. The method of any of Embodiments 1-24, further comprising configuring (907) a resultant channel state information-reference signal, CSI-RS, with a span of different periodicities in different portions of BWP or in different subbands.

Embodiment 29. A user equipment (100) adapted to perform according to any of Embodiments 1-28.

Embodiment 30. A user equipment (100) comprising:
processing circuitry (103); and
memory (105) coupled with the processing circuitry, wherein the memory includes instructions that when executed by the processing circuitry causes the communication device to perform operations according to any of Embodiments 1-28.

Embodiment 31. A computer program comprising program code to be executed by processing circuitry (103) of a user equipment (100), whereby execution of the program code causes the user equipment (100) to perform operations according to any of embodiments 1-28.

Embodiment 32. A computer program product comprising a non-transitory storage medium including program code to be executed by processing circuitry (103) of a user equipment (100), whereby execution of the program code causes the user equipment (100) to perform operations according to any of embodiments 1-28. Explanations are provided below for various abbreviations/acronyms used in the present disclosure.

| Abbreviation | Explanation |
| --- | --- |
| 3GPP | 3rd Generation Partnership Project |
| 5G | 5th Generation |
| ACK | Acknowledgement |
| CE | Control Element |
| CG | Configured Grant |
| DCI | Downlink Control Information |
| DL | Downlink |
| DMRS | Demodulation Reference Signal |
| GF | Grant-Free |
| gNB | Next Generation NodeB |
| ID | Identity |
| LCH | Logical Channel |
| LTE | Long-Term Evolution |
| MCS | Modulation and Coding Scheme |
| NACK | No Acknowledgement |
| NR | New Radio |
| PRACH | Physical Random-Access Channel |
| PUSCH | Physical Uplink Shared Channel |
| QAM | Quadrature Amplitude Modulation |
| SNR | Signal-to-Noise Ratio |
| SPS | Semi-Persistent Scheduling |
| SUL | Supplemental Uplink |
| TTI | Transmission Time Interval |
| TO | Transmission Opportunity |
| UE | User Equipment |
| UL | Uplink |
| URLLC | Ultra-Reliable and Low-Latency Communications |

References are identified below.

1. 3GPP TS38.214, $3^{rd}$ Generation Partnership Project; Technical Specification Group Radio Access Network; NR; Physical layer procedures for data (Release 16), V16.2.0 (2020-06).

2. 3GPP TS38.331, $3^{rd}$ Generation Partnership Project; Technical Specification Group Radio Access Network; NR; Radio Resource Control (RRC) protocol specification (Release 16) V16.1.0 (2020-07).

3. 3GPP TS 38.306, $3^{rd}$ Generation Partnership Project; Technical Specification Group Radio Access Network; NR; User Equipment radio access capabilities (Release 16) V16.1.0 (2020-07).

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 10:
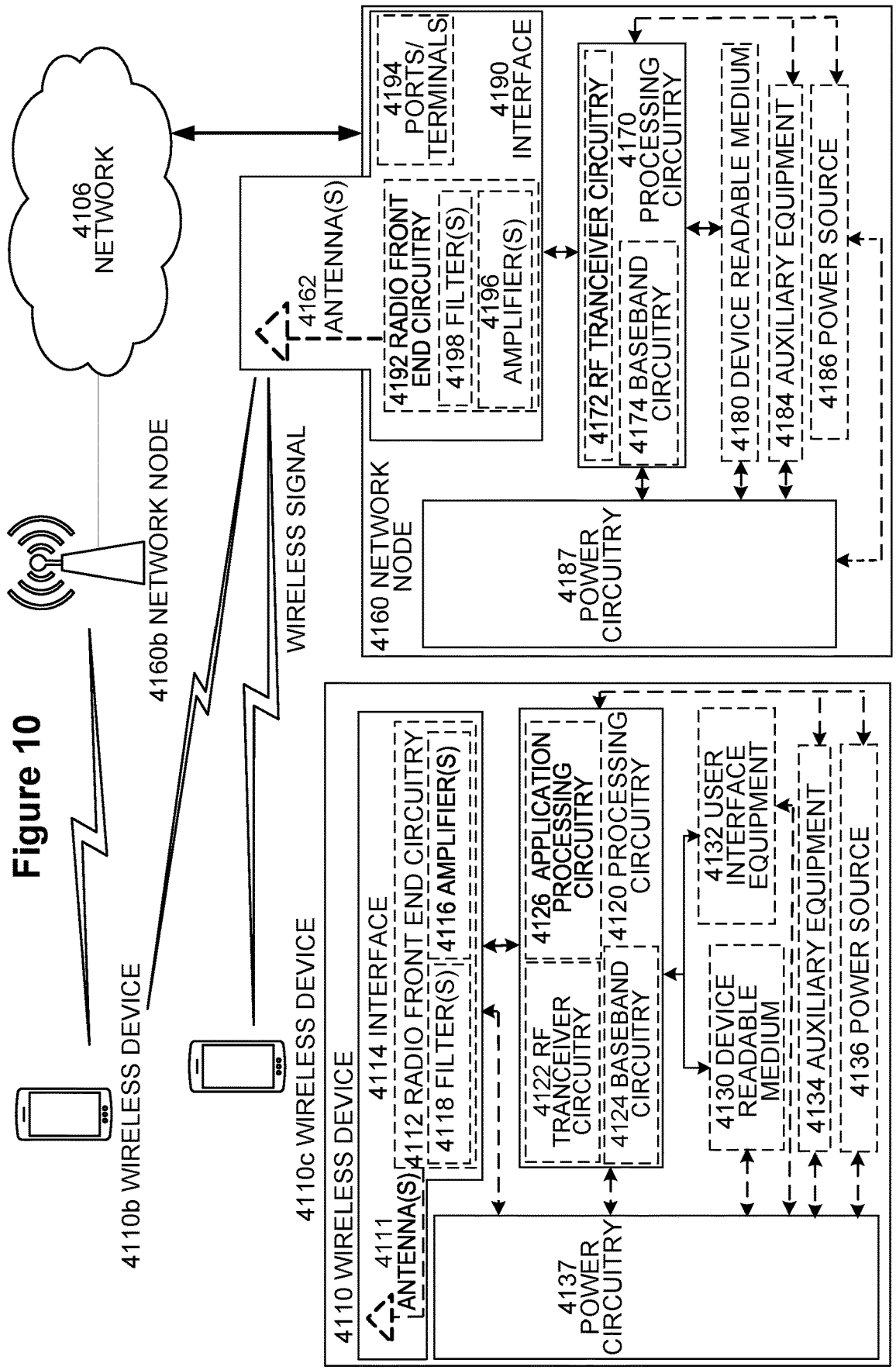
FIG. 10 is a block diagram of a wireless network in accordance with some embodiments.

FIG. 10 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 10. For simplicity, the wireless network of FIG. 10 only depicts network 4106, network nodes 4160 and 4160b, and WDs 4110, 4110b, and 4110c (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node 4160 and wireless device (WD) 4110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 4106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 4160 and WD 4110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 10, network node 4160 includes processing circuitry 4170, device readable medium 4180, interface 4190, auxiliary equipment 4184, power source 4186, power circuitry 4187, and antenna 4162. Although network node 4160 illustrated in the example wireless network of FIG. 10 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 4160 are depicted as single boxes located within a larger box, or nested within multiple boxes, in practice, a network node may comprise multiple different physical components that make up a single illustrated component (e.g., device readable medium 4180 may comprise multiple separate hard drives as well as multiple RAM modules).

Similarly, network node 4160 may be composed of multiple physically separate components (e.g., a NodeB component and a RNC component, or a BTS component and a BSC component, etc.), which may each have their own respective components. In certain scenarios in which network node 4160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 4160 may be configured to support multiple radio access technologies (RATs). In such embodiments, some components may be duplicated (e.g., separate device readable medium 4180 for the different RATs) and some components may be reused (e.g., the same antenna 4162 may be shared by the RATs). Network node 4160 may also include multiple sets of the various illustrated components for different wireless technologies integrated into network node 4160, such as, for example, GSM, WCDMA, LTE, NR, WiFi, or Bluetooth wireless technologies. These wireless technologies may be integrated into the same or different chip or set of chips and other components within network node 4160.

Processing circuitry 4170 is configured to perform any determining, calculating, or similar operations (e.g., certain obtaining operations) described herein as being provided by a network node. These operations performed by processing circuitry 4170 may include processing information obtained by processing circuitry 4170 by, for example, converting the obtained information into other information, comparing the obtained information or converted information to information stored in the network node, and/or performing one or more operations based on the obtained information or converted information, and as a result of said processing making a determination.

Processing circuitry 4170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 4160 components, such as device readable medium 4180, network node 4160 functionality. For example, processing circuitry 4170 may execute instructions stored in device readable medium 4180 or in memory within processing circuitry 4170. Such functionality may include providing any of the various wireless features, functions, or benefits discussed herein. In some embodiments, processing circuitry 4170 may include a system on a chip (SOC).

In some embodiments, processing circuitry 4170 may include one or more of radio frequency (RF) transceiver circuitry 4172 and baseband processing circuitry 4174. In some embodiments, radio frequency (RF) transceiver circuitry 4172 and baseband processing circuitry 4174 may be on separate chips (or sets of chips), boards, or units, such as radio units and digital units. In alternative embodiments, part or all of RF transceiver circuitry 4172 and baseband processing circuitry 4174 may be on the same chip or set of chips, boards, or units In certain embodiments, some or all of the functionality described herein as being provided by a network node, base station, eNB or other such network device may be performed by processing circuitry 4170 executing instructions stored on device readable medium 4180 or memory within processing circuitry 4170. In alternative embodiments, some or all of the functionality may be provided by processing circuitry 4170 without executing instructions stored on a separate or discrete device readable medium, such as in a hard-wired manner. In any of those embodiments, whether executing instructions stored on a device readable storage medium or not, processing circuitry 4170 can be configured to perform the described functionality. The benefits provided by such functionality are not limited to processing circuitry 4170 alone or to other components of network node 4160, but are enjoyed by network node 4160 as a whole, and/or by end users and the wireless network generally.

Device readable medium 4180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 4170. Device readable medium 4180 may store any suitable instructions, data or information, including a computer program, software, an application including one or more of logic, rules, code, tables, etc. and/or other instructions capable of being executed by processing circuitry 4170 and, utilized by network node 4160. Device readable medium 4180 may be used to store any calculations made by processing circuitry 4170 and/or any data received via interface 4190. In some embodiments, processing circuitry 4170 and device readable medium 4180 may be considered to be integrated.

Interface 4190 is used in the wired or wireless communication of signalling and/or data between network node 4160, network 4106, and/or WDs 4110. As illustrated, interface 4190 comprises port(s)/terminal(s) 4194 to send and receive data, for example to and from network 4106 over a wired connection. Interface 4190 also includes radio front end circuitry 4192 that may be coupled to, or in certain embodiments a part of, antenna 4162. Radio front end circuitry 4192 comprises filters 4198 and amplifiers 4196. Radio front end circuitry 4192 may be connected to antenna 4162 and processing circuitry 4170. Radio front end circuitry may be configured to condition signals communicated between antenna 4162 and processing circuitry 4170. Radio front end circuitry 4192 may receive digital data that is to be sent out to other network nodes or WDs via a wireless connection. Radio front end circuitry 4192 may convert the digital data into a radio signal having the appropriate channel and bandwidth parameters using a combination of filters 4198 and/or amplifiers 4196. The radio signal may then be transmitted via antenna 4162. Similarly, when receiving data, antenna 4162 may collect radio signals which are then converted into digital data by radio front end circuitry 4192. The digital data may be passed to processing circuitry 4170. In other embodiments, the interface may comprise different components and/or different combinations of components.

In certain alternative embodiments, network node 4160 may not include separate radio front end circuitry 4192, instead, processing circuitry 4170 may comprise radio front end circuitry and may be connected to antenna 4162 without separate radio front end circuitry 4192. Similarly, in some embodiments, all or some of RF transceiver circuitry 4172 may be considered a part of interface 4190. In still other embodiments, interface 4190 may include one or more ports or terminals 4194, radio front end circuitry 4192, and RF transceiver circuitry 4172, as part of a radio unit (not shown), and interface 4190 may communicate with baseband processing circuitry 4174, which is part of a digital unit (not shown).

Antenna 4162 may include one or more antennas, or antenna arrays, configured to send and/or receive wireless signals. Antenna 4162 may be coupled to radio front end circuitry 4192 and may be any type of antenna capable of transmitting and receiving data and/or signals wirelessly. In some embodiments, antenna 4162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 4162 may be separate from network node 4160 and may be connectable to network node 4160 through an interface or port.

Antenna 4162, interface 4190, and/or processing circuitry 4170 may be configured to perform any receiving operations and/or certain obtaining operations described herein as being performed by a network node. Any information, data and/or signals may be received from a wireless device, another network node and/or any other network equipment. Similarly, antenna 4162, interface 4190, and/or processing circuitry 4170 may be configured to perform any transmitting operations described herein as being performed by a network node. Any information, data and/or signals may be transmitted to a wireless device, another network node and/or any other network equipment.

Power circuitry 4187 may comprise, or be coupled to, power management circuitry and is configured to supply the components of network node 4160 with power for performing the functionality described herein. Power circuitry 4187 may receive power from power source 4186. Power source 4186 and/or power circuitry 4187 may be configured to provide power to the various components of network node 4160 in a form suitable for the respective components (e.g., at a voltage and current level needed for each respective component). Power source 4186 may either be included in, or external to, power circuitry 4187 and/or network node 4160. For example, network node 4160 may be connectable to an external power source (e.g., an electricity outlet) via an input circuitry or interface such as an electrical cable, whereby the external power source supplies power to power circuitry 4187. As a further example, power source 4186 may comprise a source of power in the form of a battery or battery pack which is connected to, or integrated in, power circuitry 4187. The battery may provide backup power should the external power source fail. Other types of power sources, such as photovoltaic devices, may also be used.

Alternative embodiments of network node 4160 may include additional components beyond those shown in FIG. 10 that may be responsible for providing certain aspects of the network node's functionality, including any of the functionality described herein and/or any functionality necessary to support the subject matter described herein. For example, network node 4160 may include user interface equipment to allow input of information into network node 4160 and to allow output of information from network node 4160. This may allow a user to perform diagnostic, maintenance, repair, and other administrative functions for network node 4160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 4110 includes antenna 4111, interface 4114, processing circuitry 4120, device readable medium 4130, user interface equipment 4132, auxiliary equipment 4134, power source 4136 and power circuitry 4137. WD 4110 may include multiple sets of one or more of the illustrated components for different wireless technologies supported by WD 4110, such as, for example, GSM, WCDMA, LTE, NR, WiFi, WiMAX, or Bluetooth wireless technologies, just to mention a few. These wireless technologies may be integrated into the same or different chips or set of chips as other components within WD 4110.

Antenna 4111 may include one or more antennas or antenna arrays, configured to send and/or receive wireless signals, and is connected to interface 4114. In certain alternative embodiments, antenna 4111 may be separate from WD 4110 and be connectable to WD 4110 through an interface or port. Antenna 4111, interface 4114, and/or processing circuitry 4120 may be configured to perform any receiving or transmitting operations described herein as being performed by a WD. Any information, data and/or signals may be received from a network node and/or another WD. In some embodiments, radio front end circuitry and/or antenna 4111 may be considered an interface.

As illustrated, interface 4114 comprises radio front end circuitry 4112 and antenna 4111. Radio front end circuitry 4112 comprise one or more filters 4118 and amplifiers 4116. Radio front end circuitry 4112 is connected to antenna 4111 and processing circuitry 4120, and is configured to condition signals communicated between antenna 4111 and processing circuitry 4120. Radio front end circuitry 4112 may be coupled to or a part of antenna 4111. In some embodiments, WD 4110 may not include separate radio front end circuitry 4112; rather, processing circuitry 4120 may comprise radio front end circuitry and may be connected to antenna 4111. Similarly, in some embodiments, some or all of RF transceiver circuitry 4122 may be considered a part of interface 4114. Radio front end circuitry 4112 may receive digital data that is to be sent out to other network nodes or WDs via a wireless connection. Radio front end circuitry 4112 may convert the digital data into a radio signal having the appropriate channel and bandwidth parameters using a combination of filters 4118 and/or amplifiers 4116. The radio signal may then be transmitted via antenna 4111. Similarly, when receiving data, antenna 4111 may collect radio signals which are then converted into digital data by radio front end circuitry 4112. The digital data may be passed to processing circuitry 4120. In other embodiments, the interface may comprise different components and/or different combinations of components.

Processing circuitry 4120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 4110 components, such as device readable medium 4130, WD 4110 functionality. Such functionality may include providing any of the various wireless features or benefits discussed herein. For example, processing circuitry 4120 may execute instructions stored in device readable medium 4130 or in memory within processing circuitry 4120 to provide the functionality disclosed herein.

As illustrated, processing circuitry 4120 includes one or more of RF transceiver circuitry 4122, baseband processing circuitry 4124, and application processing circuitry 4126. In other embodiments, the processing circuitry may comprise different components and/or different combinations of components. In certain embodiments processing circuitry 4120 of WD 4110 may comprise a SOC. In some embodiments, RF transceiver circuitry 4122, baseband processing circuitry 4124, and application processing circuitry 4126 may be on separate chips or sets of chips. In alternative embodiments, part or all of baseband processing circuitry 4124 and application processing circuitry 4126 may be combined into one chip or set of chips, and RF transceiver circuitry 4122 may be on a separate chip or set of chips. In still alternative embodiments, part or all of RF transceiver circuitry 4122 and baseband processing circuitry 4124 may be on the same chip or set of chips, and application processing circuitry 4126 may be on a separate chip or set of chips. In yet other alternative embodiments, part or all of RF transceiver circuitry 4122, baseband processing circuitry 4124, and application processing circuitry 4126 may be combined in the same chip or set of chips. In some embodiments, RF transceiver circuitry 4122 may be a part of interface 4114. RF transceiver circuitry 4122 may condition RF signals for processing circuitry 4120.

In certain embodiments, some or all of the functionality described herein as being performed by a WD may be provided by processing circuitry 4120 executing instructions stored on device readable medium 4130, which in certain embodiments may be a computer-readable storage medium. In alternative embodiments, some or all of the functionality may be provided by processing circuitry 4120 without executing instructions stored on a separate or discrete device readable storage medium, such as in a hard-wired manner. In any of those particular embodiments, whether executing instructions stored on a device readable storage medium or not, processing circuitry 4120 can be configured to perform the described functionality. The benefits provided by such functionality are not limited to processing circuitry 4120 alone or to other components of WD 4110, but are enjoyed by WD 4110 as a whole, and/or by end users and the wireless network generally.

Processing circuitry 4120 may be configured to perform any determining, calculating, or similar operations (e.g., certain obtaining operations) described herein as being performed by a WD. These operations, as performed by processing circuitry 4120, may include processing information obtained by processing circuitry 4120 by, for example, converting the obtained information into other information, comparing the obtained information or converted information to information stored by WD 4110, and/or performing one or more operations based on the obtained information or converted information, and as a result of said processing making a determination.

Device readable medium 4130 may be operable to store a computer program, software, an application including one or more of logic, rules, code, tables, etc. and/or other instructions capable of being executed by processing circuitry 4120. Device readable medium 4130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 4120. In some embodiments, processing circuitry 4120 and device readable medium 4130 may be considered to be integrated.

User interface equipment 4132 may provide components that allow for a human user to interact with WD 4110. Such interaction may be of many forms, such as visual, audial, tactile, etc. User interface equipment 4132 may be operable to produce output to the user and to allow the user to provide input to WD 4110. The type of interaction may vary depending on the type of user interface equipment 4132 installed in WD 4110. For example, if WD 4110 is a smart phone, the interaction may be via a touch screen; if WD 4110 is a smart meter, the interaction may be through a screen that provides usage (e.g., the number of gallons used) or a speaker that provides an audible alert (e.g., if smoke is detected). User interface equipment 4132 may include input interfaces, devices and circuits, and output interfaces, devices and circuits. User interface equipment 4132 is configured to allow input of information into WD 4110, and is connected to processing circuitry 4120 to allow processing circuitry 4120 to process the input information. User interface equipment 4132 may include, for example, a microphone, a proximity or other sensor, keys/buttons, a touch display, one or more cameras, a USB port, or other input circuitry. User interface equipment 4132 is also configured to allow output of information from WD 4110, and to allow processing circuitry 4120 to output information from WD 4110. User interface equipment 4132 may include, for example, a speaker, a display, vibrating circuitry, a USB port, a headphone interface, or other output circuitry. Using one or more input and output interfaces, devices, and circuits, of user interface equipment 4132, WD 4110 may communicate with end users and/or the wireless network, and allow them to benefit from the functionality described herein.

Auxiliary equipment 4134 is operable to provide more specific functionality which may not be generally performed by WDs. This may comprise specialized sensors for doing measurements for various purposes, interfaces for additional types of communication such as wired communications etc. The inclusion and type of components of auxiliary equipment 4134 may vary depending on the embodiment and/or scenario.

Power source 4136 may, in some embodiments, be in the form of a battery or battery pack. Other types of power sources, such as an external power source (e.g., an electricity outlet), photovoltaic devices or power cells, may also be used. WD 4110 may further comprise power circuitry 4137 for delivering power from power source 4136 to the various parts of WD 4110 which need power from power source 4136 to carry out any functionality described or indicated herein. Power circuitry 4137 may in certain embodiments comprise power management circuitry. Power circuitry 4137 may additionally or alternatively be operable to receive power from an external power source; in which case WD 4110 may be connectable to the external power source (such as an electricity outlet) via input circuitry or an interface such as an electrical power cable. Power circuitry 4137 may also in certain embodiments be operable to deliver power from an external power source to power source 4136. This may be, for example, for the charging of power source 4136. Power circuitry 4137 may perform any formatting, converting, or other modification to the power from power source 4136 to make the power suitable for the respective components of WD 4110 to which power is supplied.

Figure 11:
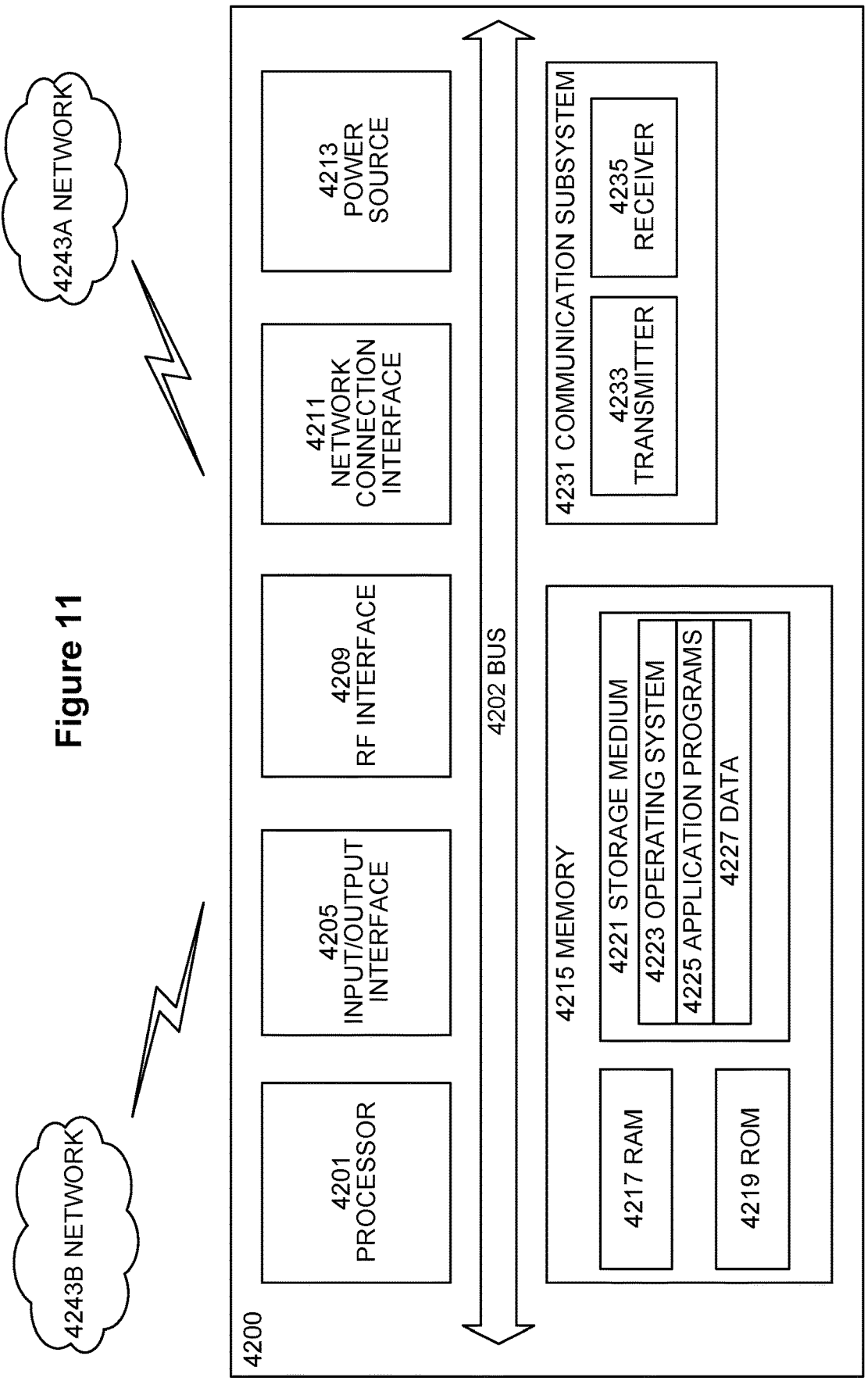
FIG. 11 is a block diagram of a user equipment in accordance with some embodiments

FIG. 11 illustrates a user Equipment in accordance with some embodiments.

FIG. 11 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 42200 may be any UE identified by the 3rd Generation Partnership Project (3GPP), including a NB-IoT UE, a machine type communication (MTC) UE, and/or an enhanced MTC (eMTC) UE. UE 4200, as illustrated in FIG. 11, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 11 is a UE, the components discussed herein are equally applicable to a WD, and vice-versa.

In FIG. 11, UE 4200 includes processing circuitry 4201 that is operatively coupled to input/output interface 4205, radio frequency (RF) interface 4209, network connection interface 4211, memory 4215 including random access memory (RAM) 4217, read-only memory (ROM) 4219, and storage medium 4221 or the like, communication subsystem 4231, power source 4213, and/or any other component, or any combination thereof. Storage medium 4221 includes operating system 4223, application program 4225, and data 4227. In other embodiments, storage medium 4221 may include other similar types of information. Certain UEs may utilize all of the components shown in FIG. 11, or only a subset of the components. The level of integration between the components may vary from one UE to another UE. Further, certain UEs may contain multiple instances of a component, such as multiple processors, memories, transceivers, transmitters, receivers, etc.

In FIG. 11, processing circuitry 4201 may be configured to process computer instructions and data. Processing circuitry 4201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 4201 may include two central processing units (CPUs). Data may be information in a form suitable for use by a computer.

In the depicted embodiment, input/output interface 4205 may be configured to provide a communication interface to an input device, output device, or input and output device. UE 4200 may be configured to use an output device via input/output interface 4205. An output device may use the same type of interface port as an input device. For example, a USB port may be used to provide input to and output from UE 4200. The output device may be a speaker, a sound card, a video card, a display, a monitor, a printer, an actuator, an emitter, a smartcard, another output device, or any combination thereof. UE 4200 may be configured to use an input device via input/output interface 4205 to allow a user to capture information into UE 4200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 11, RF interface 4209 may be configured to provide a communication interface to RF components such as a transmitter, a receiver, and an antenna. Network connection interface 4211 may be configured to provide a communication interface to network 4243a. Network 4243a may encompass wired and/or wireless networks such as a local-area network (LAN), a wide-area network (WAN), a computer network, a wireless network, a telecommunications network, another like network or any combination thereof. For example, network 4243a may comprise a Wi-Fi network. Network connection interface 4211 may be configured to include a receiver and a transmitter interface used to communicate with one or more other devices over a communication network according to one or more communication protocols, such as Ethernet, TCP/IP, SONET, ATM, or the like. Network connection interface 4211 may implement receiver and transmitter functionality appropriate to the communication network links (e.g., optical, electrical, and the like). The transmitter and receiver functions may share circuit components, software or firmware, or alternatively may be implemented separately.

RAM 4217 may be configured to interface via bus 4202 to processing circuitry 4201 to provide storage or caching of data or computer instructions during the execution of software programs such as the operating system, application programs, and device drivers. ROM 4219 may be configured to provide computer instructions or data to processing circuitry 4201. For example, ROM 4219 may be configured to store invariant low-level system code or data for basic system functions such as basic input and output (I/O), startup, or reception of keystrokes from a keyboard that are stored in a non-volatile memory. Storage medium 4221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 4221 may be configured to include operating system 4223, application program 4225 such as a web browser application, a widget or gadget engine or another application, and data file 4227. Storage medium 4221 may store, for use by UE 4200, any of a variety of various operating systems or combinations of operating systems.

Storage medium 4221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 4221 may allow UE 4200 to access computer-executable instructions, application programs or the like, stored on transitory or non-transitory memory media, to off-load data, or to upload data. An article of manufacture, such as one utilizing a communication system may be tangibly embodied in storage medium 4221, which may comprise a device readable medium.

In FIG. 11, processing circuitry 4201 may be configured to communicate with network 4243b using communication subsystem 4231. Network 4243a and network 4243b may be the same network or networks or different network or networks. Communication subsystem 4231 may be configured to include one or more transceivers used to communicate with network 4243b. For example, communication subsystem 4231 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 4233 and/or receiver 4235 to implement transmitter or receiver functionality, respectively, appropriate to the RAN links (e.g., frequency allocations and the like). Further, transmitter 4233 and receiver 4235 of each transceiver may share circuit components, software or firmware, or alternatively may be implemented separately.

In the illustrated embodiment, the communication functions of communication subsystem 4231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 4231 may include cellular communication, Wi-Fi communication, Bluetooth communication, and GPS communication. Network 4243b may encompass wired and/or wireless networks such as a local-area network (LAN), a wide-area network (WAN), a computer network, a wireless network, a telecommunications network, another like network or any combination thereof. For example, network 4243b may be a cellular network, a Wi-Fi network, and/or a near-field network. Power source 4213 may be configured to provide alternating current (AC) or direct current (DC) power to components of UE 4200.

The features, benefits and/or functions described herein may be implemented in one of the components of UE 4200 or partitioned across multiple components of UE 4200. Further, the features, benefits, and/or functions described herein may be implemented in any combination of hardware, software or firmware. In one example, communication subsystem 4231 may be configured to include any of the components described herein. Further, processing circuitry 4201 may be configured to communicate with any of such components over bus 4202. In another example, any of such components may be represented by program instructions stored in memory that when executed by processing circuitry 4201 perform the corresponding functions described herein. In another example, the functionality of any of such components may be partitioned between processing circuitry 4201 and communication subsystem 4231. In another example, the non-computationally intensive functions of any of such components may be implemented in software or firmware and the computationally intensive functions may be implemented in hardware.

Figure 12:
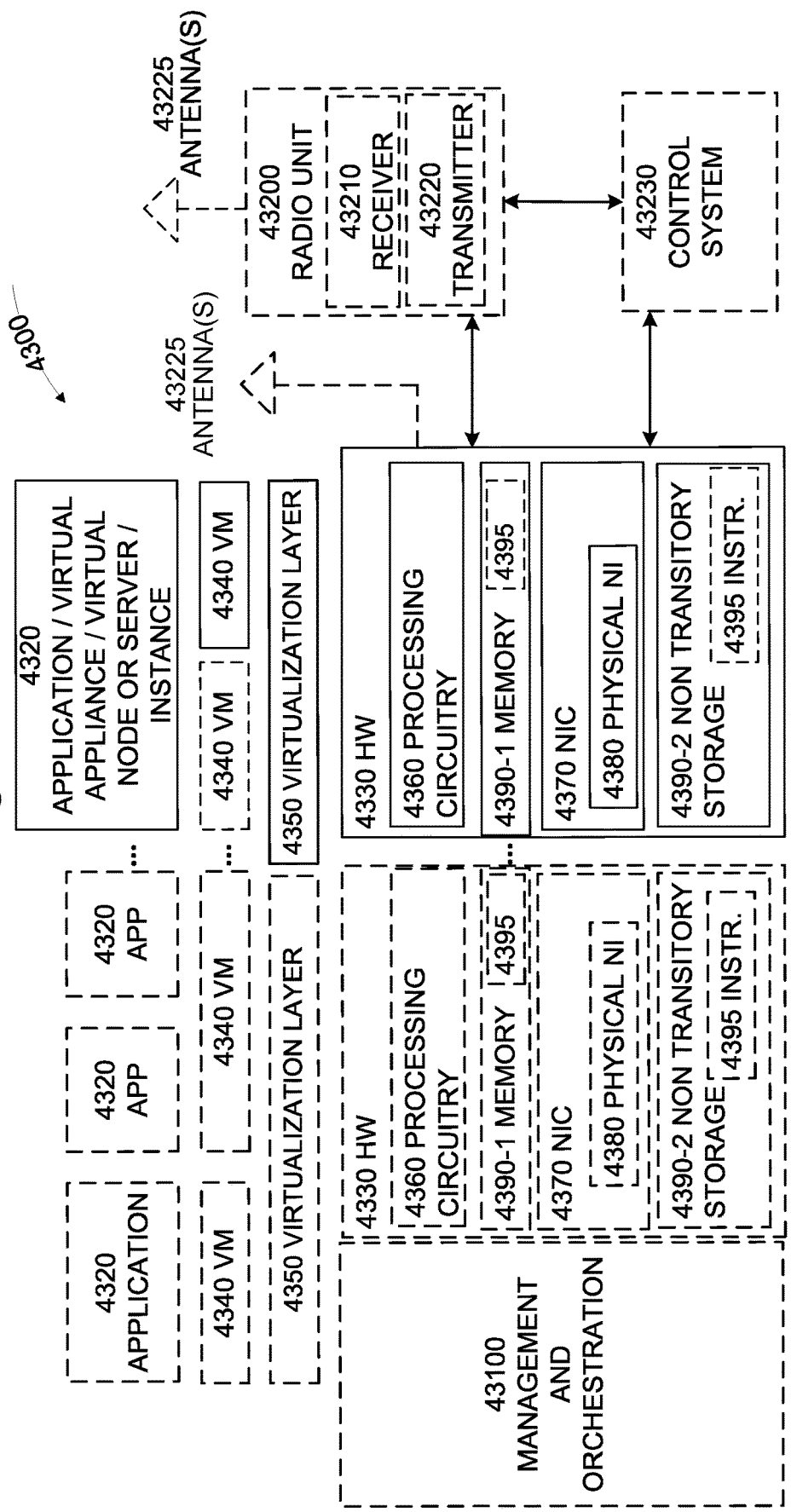
FIG. 12 is a block diagram of a virtualization environment in accordance with some embodiments.

FIG. 12 illustrates a virtualization environment in accordance with some embodiments.

FIG. 12 is a schematic block diagram illustrating a virtualization environment 4300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 4300 hosted by one or more of hardware nodes 4330. Further, in embodiments in which the virtual node is not a radio access node or does not require radio connectivity (e.g., a core network node), then the network node may be entirely virtualized.

The functions may be implemented by one or more applications 4320 (which may alternatively be called software instances, virtual appliances, network functions, virtual nodes, virtual network functions, etc.) operative to implement some of the features, functions, and/or benefits of some of the embodiments disclosed herein. Applications 4320 are run in virtualization environment 4300 which provides hardware 4330 comprising processing circuitry 4360 and memory 4390. Memory 4390 contains instructions 4395 executable by processing circuitry 4360 whereby application 4320 is operative to provide one or more of the features, benefits, and/or functions disclosed herein.

Virtualization environment 4300, comprises general-purpose or special-purpose network hardware devices 4330 comprising a set of one or more processors or processing circuitry 4360, which may be commercial off-the-shelf (COTS) processors, dedicated Application Specific Integrated Circuits (ASICs), or any other type of processing circuitry including digital or analog hardware components or special purpose processors. Each hardware device may comprise memory 4390-1 which may be non-persistent memory for temporarily storing instructions 4395 or software executed by processing circuitry 4360. Each hardware device may comprise one or more network interface controllers (NICs) 4370, also known as network interface cards, which include physical network interface 4380. Each hardware device may also include non-transitory, persistent, machine-readable storage media 4390-2 having stored therein software 4395 and/or instructions executable by processing circuitry 4360. Software 4395 may include any type of software including software for instantiating one or more virtualization layers 4350 (also referred to as hypervisors), software to execute virtual machines 4340 as well as software allowing it to execute functions, features and/or benefits described in relation with some embodiments described herein.

Virtual machines 4340 comprise virtual processing, virtual memory, virtual networking or interface and virtual storage, and may be run by a corresponding virtualization layer 4350 or hypervisor. Different embodiments of the instance of virtual appliance 4320 may be implemented on one or more of virtual machines 4340, and the implementations may be made in different ways.

During operation, processing circuitry 4360 executes software 4395 to instantiate the hypervisor or virtualization layer 4350, which may sometimes be referred to as a virtual machine monitor (VMM). Virtualization layer 4350 may present a virtual operating platform that appears like networking hardware to virtual machine 4340.

As shown in FIG. 12, hardware 4330 may be a standalone network node with generic or specific components. Hardware 4330 may comprise antenna 43225 and may implement some functions via virtualization. Alternatively, hardware 4330 may be part of a larger cluster of hardware (e.g. such as in a data center or customer premise equipment (CPE)) where many hardware nodes work together and are managed via management and orchestration (MANO) 43100, which, among others, oversees lifecycle management of applications 4320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 4340 may be a software implementation of a physical machine that runs programs as if they were executing on a physical, non-virtualized machine. Each of virtual machines 4340, and that part of hardware 4330 that executes that virtual machine, be it hardware dedicated to that virtual machine and/or hardware shared by that virtual machine with others of the virtual machines 4340, forms a separate virtual network elements (VNE).

Still in the context of NFV, Virtual Network Function (VNF) is responsible for handling specific network functions that run in one or more virtual machines 4340 on top of hardware networking infrastructure 4330 and corresponds to application 4320 in FIG. 12.

In some embodiments, one or more radio units 43200 that each include one or more transmitters 43220 and one or more receivers 43210 may be coupled to one or more antennas 43225. Radio units 43200 may communicate directly with hardware nodes 4330 via one or more appropriate network interfaces and may be used in combination with the virtual components to provide a virtual node with radio capabilities, such as a radio access node or a base station.

In some embodiments, some signalling can be effected with the use of control system 43230 which may alternatively be used for communication between the hardware nodes 4330 and radio units 43200.

Figure 13:
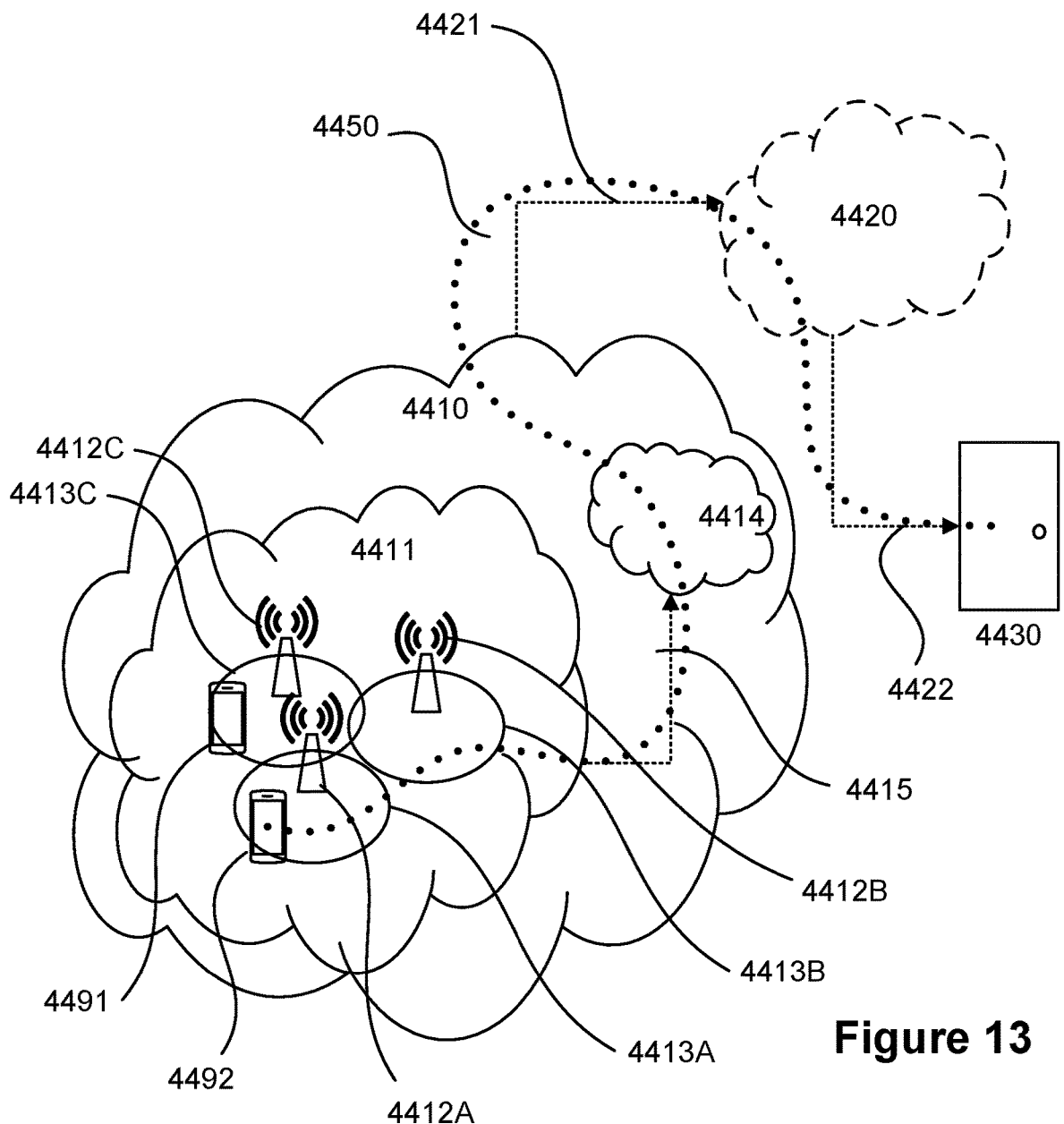
FIG. 13 is a block diagram of a telecommunication network connected via an intermediate network to a host computer in accordance with some embodiments.

FIG. 13 illustrates a telecommunication network connected via an intermediate network to a host computer in accordance with some embodiments.

With reference to FIG. 13, in accordance with an embodiment, a communication system includes telecommunication network 4410, such as a 3GPP-type cellular network, which comprises access network 4411, such as a radio access network, and core network 4414. Access network 4411 comprises a plurality of base stations 4412a, 4412b, 4412c, such as NBs, eNBs, gNBs or other types of wireless access points, each defining a corresponding coverage area 4413a, 4413b, 4413c. Each base station 4412a, 4412b, 4412c is connectable to core network 4414 over a wired or wireless connection 4415. A first UE 4491 located in coverage area 4413c is configured to wirelessly connect to, or be paged by, the corresponding base station 4412c. A second UE 4492 in coverage area 4413a is wirelessly connectable to the corresponding base station 4412a. While a plurality of UEs 4491, 4492 are illustrated in this example, the disclosed embodiments are equally applicable to a situation where a sole UE is in the coverage area or where a sole UE is connecting to the corresponding base station 4412.

Telecommunication network 4410 is itself connected to host computer 4430, which may be embodied in the hardware and/or software of a standalone server, a cloud-implemented server, a distributed server or as processing resources in a server farm. Host computer 4430 may be under the ownership or control of a service provider, or may be operated by the service provider or on behalf of the service provider. Connections 4421 and 4422 between telecommunication network 4410 and host computer 4430 may extend directly from core network 4414 to host computer 4430 or may go via an optional intermediate network 4420. Intermediate network 4420 may be one of, or a combination of more than one of, a public, private or hosted network; intermediate network 4420, if any, may be a backbone network or the Internet; in particular, intermediate network 4420 may comprise two or more sub-networks (not shown).

The communication system of FIG. 13 as a whole enables connectivity between the connected UEs 4491, 4492 and host computer 4430. The connectivity may be described as an over-the-top (OTT) connection 4450. Host computer 4430 and the connected UEs 4491, 4492 are configured to communicate data and/or signaling via OTT connection 4450, using access network 4411, core network 4414, any intermediate network 4420 and possible further infrastructure (not shown) as intermediaries. OTT connection 4450 may be transparent in the sense that the participating communication devices through which OTT connection 4450 passes are unaware of routing of uplink and downlink communications. For example, base station 4412 may not or need not be informed about the past routing of an incoming downlink communication with data originating from host computer 4430 to be forwarded (e.g., handed over) to a connected UE 4491. Similarly, base station 4412 need not be aware of the future routing of an outgoing uplink communication originating from the UE 4491 towards the host computer 4430.

Figure 14:
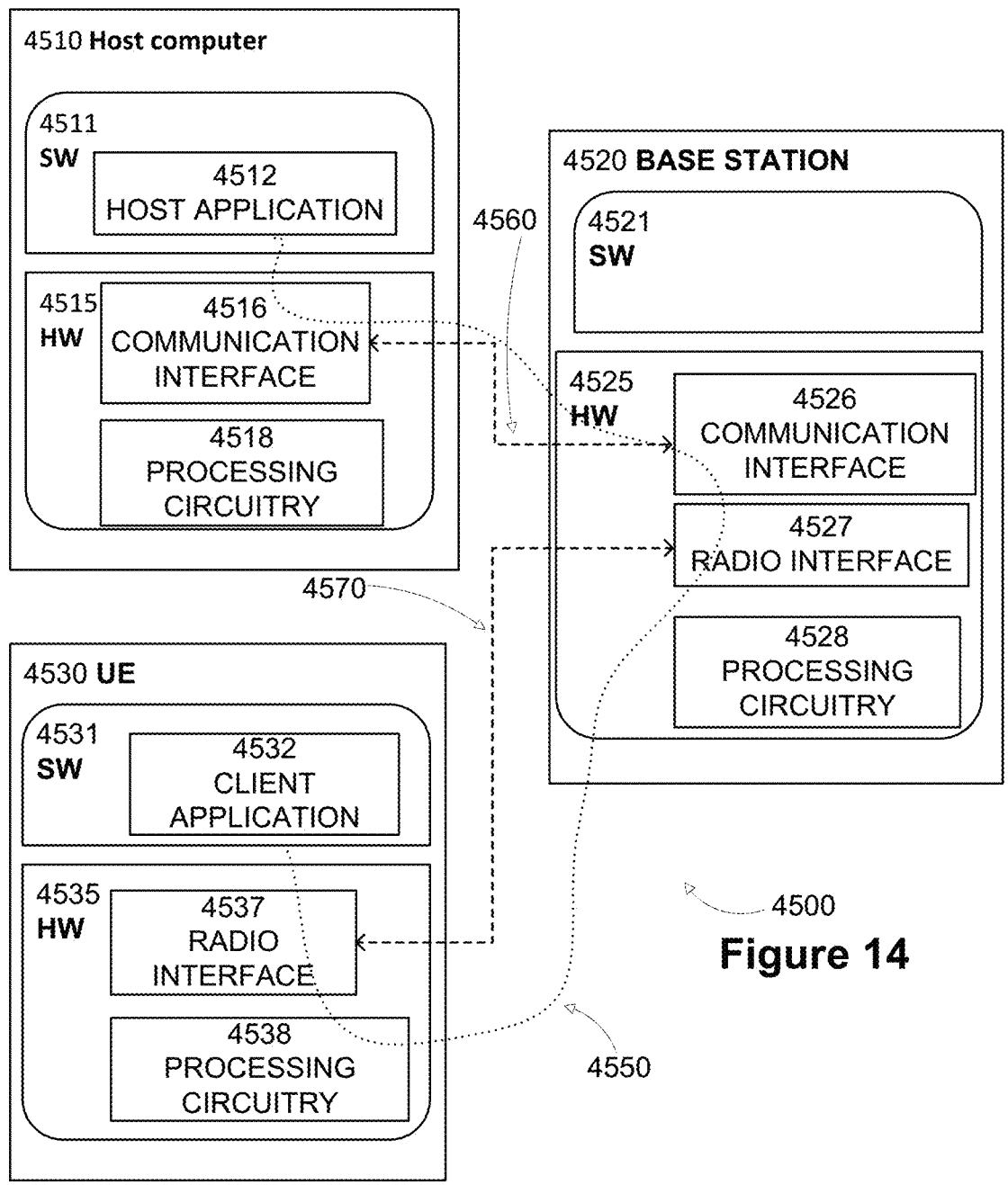
FIG. 14 is a block diagram of a host computer communicating via a base station with a user equipment over a partially wireless connection in accordance with some embodiments.

FIG. 14 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 14. In communication system 4500, host computer 4510 comprises hardware 4515 including communication interface 4516 configured to set up and maintain a wired or wireless connection with an interface of a different communication device of communication system 4500. Host computer 4510 further comprises processing circuitry 4518, which may have storage and/or processing capabilities. In particular, processing circuitry 4518 may comprise one or more programmable processors, application-specific integrated circuits, field programmable gate arrays or combinations of these (not shown) adapted to execute instructions. Host computer 4510 further comprises software 4511, which is stored in or accessible by host computer 4510 and executable by processing circuitry 4518. Software 4511 includes host application 4512. Host application 4512 may be operable to provide a service to a remote user, such as UE 4530 connecting via OTT connection 4550 terminating at UE 4530 and host computer 4510. In providing the service to the remote user, host application 4512 may provide user data which is transmitted using OTT connection 4550.

Communication system 4500 further includes base station 4520 provided in a telecommunication system and comprising hardware 4525 enabling it to communicate with host computer 4510 and with UE 4530. Hardware 4525 may include communication interface 4526 for setting up and maintaining a wired or wireless connection with an interface of a different communication device of communication system 4500, as well as radio interface 4527 for setting up and maintaining at least wireless connection 4570 with UE 4530 located in a coverage area (not shown in FIG. 14) served by base station 4520. Communication interface 4526 may be configured to facilitate connection 4560 to host computer 4510. Connection 4560 may be direct or it may pass through a core network (not shown in FIG. 14) of the telecommunication system and/or through one or more intermediate networks outside the telecommunication system. In the embodiment shown, hardware 4525 of base station 4520 further includes processing circuitry 4528, which may comprise one or more programmable processors, application-specific integrated circuits, field programmable gate arrays or combinations of these (not shown) adapted to execute instructions. Base station 4520 further has software 4521 stored internally or accessible via an external connection.

Communication system 4500 further includes UE 4530 already referred to. Its hardware 4535 may include radio interface 4537 configured to set up and maintain wireless connection 4570 with a base station serving a coverage area in which UE 4530 is currently located. Hardware 4535 of UE 4530 further includes processing circuitry 4538, which may comprise one or more programmable processors, application-specific integrated circuits, field programmable gate arrays or combinations of these (not shown) adapted to execute instructions. UE 4530 further comprises software 4531, which is stored in or accessible by UE 4530 and executable by processing circuitry 4538. Software 4531 includes client application 4532. Client application 4532 may be operable to provide a service to a human or non-human user via UE 4530, with the support of host computer 4510. In host computer 4510, an executing host application 4512 may communicate with the executing client application 4532 via OTT connection 4550 terminating at UE 4530 and host computer 4510. In providing the service to the user, client application 4532 may receive request data from host application 4512 and provide user data in response to the request data. OTT connection 4550 may transfer both the request data and the user data. Client application 4532 may interact with the user to generate the user data that it provides.

It is noted that host computer 4510, base station 4520 and UE 4530 illustrated in FIG. 14 may be similar or identical to host computer 4430, one of base stations 4412a, 4412b, 4412c and one of UEs 4491, 4492 of FIG. 13, respectively. This is to say, the inner workings of these entities may be as shown in FIG. 14 and independently, the surrounding network topology may be that of FIG. 13.

In FIG. 14, OTT connection 4550 has been drawn abstractly to illustrate the communication between host computer 4510 and UE 4530 via base station 4520, without explicit reference to any intermediary devices and the precise routing of messages via these devices. Network infrastructure may determine the routing, which it may be configured to hide from UE 4530 or from the service provider operating host computer 4510, or both. While OTT connection 4550 is active, the network infrastructure may further take decisions by which it dynamically changes the routing (e.g., on the basis of load balancing consideration or reconfiguration of the network).

Wireless connection 4570 between UE 4530 and base station 4520 is in accordance with the teachings of the embodiments described throughout this disclosure. One or more of the various embodiments may improve the performance of OTT services provided to UE 4530 using OTT connection 4550, in which wireless connection 4570 forms the last segment. More precisely, the teachings of these embodiments may improve the random access speed and/or reduce random access failure rates and thereby provide benefits such as faster and/or more reliable random access.

A measurement procedure may be provided for the purpose of monitoring data rate, latency and other factors on which the one or more embodiments improve. There may further be an optional network functionality for reconfiguring OTT connection 4550 between host computer 4510 and UE 4530, in response to variations in the measurement results. The measurement procedure and/or the network functionality for reconfiguring OTT connection 4550 may be implemented in software 4511 and hardware 4515 of host computer 4510 or in software 4531 and hardware 4535 of UE 4530, or both. In embodiments, sensors (not shown) may be deployed in or in association with communication devices through which OTT connection 4550 passes; the sensors may participate in the measurement procedure by supplying values of the monitored quantities exemplified above, or supplying values of other physical quantities from which software 4511, 4531 may compute or estimate the monitored quantities. The reconfiguring of OTT connection 4550 may include message format, retransmission settings, preferred routing etc.; the reconfiguring need not affect base station 4520, and it may be unknown or imperceptible to base station 4520. Such procedures and functionalities may be known and practiced in the art. In certain embodiments, measurements may involve proprietary UE signaling facilitating host computer 4510's measurements of throughput, propagation times, latency and the like. The measurements may be implemented in that software 4511 and 4531 causes messages to be transmitted, in particular empty or 'dummy' messages, using OTT connection 4550 while it monitors propagation times, errors etc.

FIG. 15 illustrates methods implemented in a communication system including a host computer, a base station and a user equipment in accordance with some embodiments.

FIG. 15 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 15 will be included in this section. In step 4610, the host computer provides user data. In substep 4611 (which may be optional) of step 4610, the host computer provides the user data by executing a host application. In step 4620, the host computer initiates a transmission carrying the user data to the UE. In step 4630 (which may be optional), the base station transmits to the UE the user data which was carried in the transmission that the host computer initiated, in accordance with the teachings of the embodiments described throughout this disclosure. In step 4640 (which may also be optional), the UE executes a client application associated with the host application executed by the host computer.

FIG. 16 illustrates methods implemented in a communication system including a host computer, a base station and a user equipment in accordance with some embodiments.

FIG. 16 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 16 will be included in this section. In step 4710 of the method, the host computer provides user data. In an optional substep (not shown) the host computer provides the user data by executing a host application. In step 4720, the host computer initiates a transmission carrying the user data to the UE. The transmission may pass via the base station, in accordance with the teachings of the embodiments described throughout this disclosure. In step 4730 (which may be optional), the UE receives the user data carried in the transmission.

FIG. 17 illustrates methods implemented in a communication system including a host computer, a base station and a user equipment in accordance with some embodiments FIG. 17 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 17 will be included in this section. In step 4810 (which may be optional), the UE receives input data provided by the host computer. Additionally or alternatively, in step 4820, the UE provides user data. In substep 4821 (which may be optional) of step 4820, the UE provides the user data by executing a client application. In substep 4811 (which may be optional) of step 4810, the UE executes a client application which provides the user data in reaction to the received input data provided by the host computer. In providing the user data, the executed client application may further consider user input received from the user. Regardless of the specific manner in which the user data was provided, the UE initiates, in substep 4830 (which may be optional), transmission of the user data to the host computer. In step 4840 of the method, the host computer receives the user data transmitted from the UE, in accordance with the teachings of the embodiments described throughout this disclosure.

FIG. 18 illustrates methods implemented in a communication system including a host computer, a base station and a user equipment in accordance with some embodiments FIG. 18 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 18 will be included in this section. In step 4910 (which may be optional), in accordance with the teachings of the embodiments described throughout this disclosure, the base station receives user data from the UE. In step 4920 (which may be optional), the base station initiates transmission of the received user data to the host computer. In step 4930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Abbreviations

At least some of the following abbreviations may be used in this disclosure. If there is an inconsistency between abbreviations, preference should be given to how it is used above. If listed multiple times below, the first listing should be preferred over any subsequent listing(s).

1xRTT CDMA2000 1x Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network
Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" (abbreviated "/") includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method in a user equipment, UE, for reporting channel state information, CSI, to a network, the method comprising:
    determining a number of subbands of a bandwidth part, BWP, to report CSI;
    determining a CSI computation time including a CSI computation delay requirement;
    performing CSI estimation for a plurality of the number of subbands based on the CSI computation time; and
    reporting the CSI report for at least one of the number of subbands, determining the CSI computation time comprising determining the CSI computation delay requirement, and determining the CSI computation delay comprising applying CSI computation delay requirement $Z_1$ and their primes $Z'_1$ for wideband frequency granularity to subband frequency granularity.

2. The method of claim 1, wherein applying $Z_1$ and $Z'_1$ comprises applying $Z_1$ and $Z'_1$ when the UE reports CSI for two or more subbands.

3. The method of claim 1, wherein applying $Z_1$ and $Z'_1$ comprises applying $Z_1$ and $Z'_1$ for subband reporting for a CSI report.

4. The method of claim 3, wherein applying $Z_1$ and $Z'_1$ for subband reporting for a CSI report comprises one of:
    responsive to a reportQuantity being set to 'cri-RI-PMI-CQI', or 'cri-RI-LI-PMI-CQI', determining that precoding matrix indicator, PMI, reporting is wideband and channel quality indicator, CQI, reporting is subband using $Z_1$ and $Z'_1$;
    responsive to the reportQuantity being set to 'cri-RI-PMI-CQI', or 'cri-RI-LI-PMI-CQI', determining that PMI reporting is subband using $Z_1$ and $Z'_1$, and CQI reporting is wideband; and
    responsive to the reportQuantity being set to 'cri-RI-CQI' or 'cri-RI-i1-CQI', determining that CQI reporting is a subband CQI with a lowest CQI index in addition to wideband PMI and CQI using $Z_1$ and $Z'_1$.

5. The method of claim 3, wherein applying $Z_1$ and $Z'_1$ for subband reporting for a CSI report comprises applying $Z_1$ and $Z'_1$ only when the UE is configured to or triggered dynamically to measure CSI on a number of subbands that do not exceed a threshold $N_{subband,th}$.

6. The method of claim 1, wherein the CSI computation delay requirement scales with a sum of a total number of physical resource blocks, PRBs, that are configured by the network to evaluate and report.

7. The method of claim 1, wherein the CSI computation delay requirement scales with a combination of a sum of a total number of physical resource blocks, PRBs, a number of subbands, and a number of antenna ports in CSI resources that are configured by the network to evaluate and report.

8. The method of claim 1, wherein for a given BWP, a maximum N subbands are available, and wherein performing CSI estimation for the number of subbands comprises performing CSI estimation across the N subbands and reporting the CSI report comprises reporting wideband CQI and/or PMI across N subbands, subband CQIs and/or PMI for M subbands, where the M<N subbands are one of signaled to the UE or determined by the UE.

9. The method of claim 1, wherein for a given BWP, a maximum N subbands are available, and wherein performing CSI estimation for the number of subbands comprises performing CSI estimation across the N subbands and reporting the CSI report comprises reporting subband CQIs and/or PMI for M subbands, where M<N.

10. The method of claim 1, wherein for a given BWP, a maximum N subbands are available, and wherein performing CSI estimation for the number of subbands comprises performing CSI estimation across the N subbands and reporting the CSI report comprises reporting a wideband PMI, CQI and rank indicator, RI, and a subband CQI with the lowest CSI index conditioned on the wideband PMI and the RI.

11. The method of claim 8, wherein reporting the subband CQI comprises reporting CQI for a best subband and reporting remaining subband CQIs in a form of differential encoding.

12. The method of claim 8, wherein reporting the subband CQI comprises reporting CQI for a worst subband and reporting remaining subband CQIs in a form of differential encoding.

13. The method of claim 1, wherein determining the number of subbands of the BWP comprises determining the number of subbands by the bandwidth of the BWP and a radio resource control, RRC, configurable field subbandSize.

14. The method of claim 1, wherein reporting the CSI report for at least one of the number of subbands comprises reporting the CSI report for a subband indicated by a radio access network, RAN, node.

15. The method of claim 14, further comprising receiving an identity of the subband indicated by the RAN node by one or more of downlink control information, DCI, media access control-control element, MAC CE, and RRC signaling.

16. The method of claim 15, wherein receiving the identity of the subband indicated by the RAN node comprises receiving the identity by DCI, wherein each code point of a field in DCI points to a row of a RRC-configurable table, in which each row indicates the subbands to report.

17. The method of claim 15, wherein receiving the identity of the subband indicated by the RAN node comprises receiving the identity by MAC-CE dynamically switching which subset of a list comprising a CSI-FreqReportList is activated.

18. A user equipment comprising:
processing circuitry; and
memory coupled with the processing circuitry to configure the user equipment to:
 determine a number of subbands of a bandwidth part, BWP, to report CSI;
 determine a CSI computation time including a CSI computation delay requirement;
 perform CSI estimation for a plurality of the number of subbands based on the CSI computation time; and
 report the CSI report for at least one of the number of subbands, determining the CSI computation time comprising determining the CSI computation delay requirement, and determining the CSI computation delay comprising applying CSI computation delay requirement Z1 and their primes Z'1 for wideband frequency granularity to subband frequency granularity.

* * * * *